(12) United States Patent
Meisenholder et al.

(10) Patent No.: US 12,266,066 B2
(45) Date of Patent: Apr. 1, 2025

(54) GEOSPATIAL IMAGE SURFACING AND SELECTION

(71) Applicants: David Meisenholder, Los Angeles, CA (US); Celia Mourkogiannis, Los Angeles, CA (US); Donald Giovannini, Venice, CA (US)

(72) Inventors: David Meisenholder, Los Angeles, CA (US); Celia Mourkogiannis, Los Angeles, CA (US); Donald Giovannini, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/608,519

(22) Filed: Mar. 18, 2024

(65) Prior Publication Data
US 2024/0221331 A1 Jul. 4, 2024

Related U.S. Application Data

(63) Continuation of application No. 18/139,673, filed on Apr. 26, 2023, now Pat. No. 11,948,262, which is a (Continued)

(51) Int. Cl.
*G06T 19/00* (2011.01)
*G02B 27/00* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS

| 9,734,402 B2 | 8/2017 | Jang et al. |
| 10,368,212 B2 | 7/2019 | Kweon et al. |

(Continued)

FOREIGN PATENT DOCUMENTS

| CN | 104102344 A | 10/2014 |
| CN | 106030458 A | 10/2016 |

(Continued)

OTHER PUBLICATIONS

1st Chinese Office Action for CN 202180022350.6 dated Sep. 28, 2024 (Sep. 28, 2024), 9 pages; English translation—3 pages.
(Continued)

*Primary Examiner* — Ryan M Gray
(74) *Attorney, Agent, or Firm* — CM Law; Stephen J. Weed

(57) ABSTRACT

System, method, and non-transitory computer readable medium for presenting images on a mobile device. Images are presented by monitoring the location and the orientation of the mobile device, requesting previously captured images corresponding to where the previously captured images were captured in relation to the location from a server, receiving the requested previously captured images from the server, selecting images from the requested previously captured images responsive to the location and the orientation of the mobile device, generating overlay images from the selected images including image icons associated with the selected images, presenting the overlay images on an optical assembly, receiving an image selection identifying one of the image icons in the presented overlay images, and display the selected image associated with the identified image icon on the viewing area of the optical assembly.

20 Claims, 15 Drawing Sheets

Related U.S. Application Data continuation of application No. 17/500,006, filed on Oct. 13, 2021, now Pat. No. 11,663,793, which is a continuation of application No. 16/821,188, filed on Mar. 17, 2020, now Pat. No. 11,176,751.

(51) Int. Cl.
| | |
|---|---|
| *G02B 27/01* | (2006.01) |
| *G06F 3/04817* | (2022.01) |
| *G06F 3/0488* | (2022.01) |
| *H04N 13/383* | (2018.01) |
| *H04W 4/029* | (2018.01) |

(52) U.S. Cl.
CPC ........ *G06F 3/04817* (2013.01); *G06F 3/0488* (2013.01); *H04N 13/383* (2018.05); *H04W 4/029* (2018.02); *G02B 2027/0178* (2013.01); *G06T 2219/2004* (2013.01)

(56) References Cited

U.S. PATENT DOCUMENTS

| | | | |
|---|---|---|---|
| 10,387,487 B1* | 8/2019 | Svendsen | G06F 16/9535 |
| 10,495,878 B2 | 12/2019 | Chi et al. | |
| 10,878,629 B2* | 12/2020 | Ishikawa | G06F 3/0481 |
| 11,068,534 B1 | 7/2021 | Svendsen | |
| 11,176,751 B2 | 11/2021 | Meisenholder et al. | |
| 11,948,262 B2 | 4/2024 | Meisenholder et al. | |
| 2015/0168729 A1 | 6/2015 | Kobayashi | |
| 2016/0041727 A1 | 2/2016 | Choi et al. | |
| 2016/0048211 A1 | 2/2016 | Raffle | |
| 2016/0170480 A1 | 6/2016 | Aonuma et al. | |
| 2016/0259977 A1 | 9/2016 | Asbun et al. | |
| 2017/0337744 A1 | 11/2017 | Martin | |
| 2018/0136465 A1 | 5/2018 | Chi et al. | |
| 2018/0284962 A1 | 10/2018 | Ballard et al. | |
| 2019/0221191 A1* | 7/2019 | Chhipa | G09G 3/002 |
| 2019/0227694 A1 | 7/2019 | Shin et al. | |
| 2019/0318541 A1 | 10/2019 | Sergott et al. | |

FOREIGN PATENT DOCUMENTS

| | | |
|---|---|---|
| CN | 107615227 A | 1/2018 |
| CN | 110045816 A | 7/2019 |
| EP | 3090322 A1 | 11/2016 |
| KR | 1020150129546 A | 11/2015 |
| KR | 1020160128119 A | 11/2016 |
| KR | 1020170141473 A | 12/2017 |

OTHER PUBLICATIONS

International Search Report and Written Opinion for International Application No. PCT/US2021/019512, dated Jun. 15, 2021 (Jun. 15, 2021)—9 pages.

O'Hare, Neil, et al. "My digital photos: where and when?." Proceedings of the 13th annual ACM international conference on Multimedia. 2005.

Toyama, Kentaro, Ron Logan, and Asta Roseway. "Geographic location tags on digital images." Proceedings of the eleventh ACM international conference on Multimedia. 2003.

Yousef, Kharsim, and Eamonn O'Neill. "Sunrise: towards location based clustering for assisted photo management." Proceedings of the 2007 workshop on Tagging, mining and retrieval of human related activity information. 2007.

* cited by examiner

GEOSPATIAL IMAGE SURFACING AND SELECTION

CROSS-REFERENCE TO RELATED APPLICATIONS

This application is a Continuation of U.S. application Ser. No. 18/139,673 filed on Apr. 26, 2023, now U.S. Pat. No. 11,948,262, which is a Continuation of U.S. application Ser. No. 17/500,006 filed on Oct. 13, 2021, now U.S. Pat. No. 11,663,793, which is a Continuation of U.S. application Ser. No. 16/821,188 filed on Mar. 17, 2020, now U.S. Pat. No. 11,176,751, all of which are incorporated fully herein by reference.

TECHNICAL FIELD

The present subject matter relates to mobile devices, e.g., eyewear devices, and, more particularly, to visually presenting images based on the physical location of the mobile devices.

BACKGROUND

Mobile devices, including cellular telephones and eyewear devices, such as smart glasses, headwear, and headgear, integrate image displays and cameras. Such devices can capture and present images. Many mobile devices also integrate sensors capable of determining the physical location of the mobile devices.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
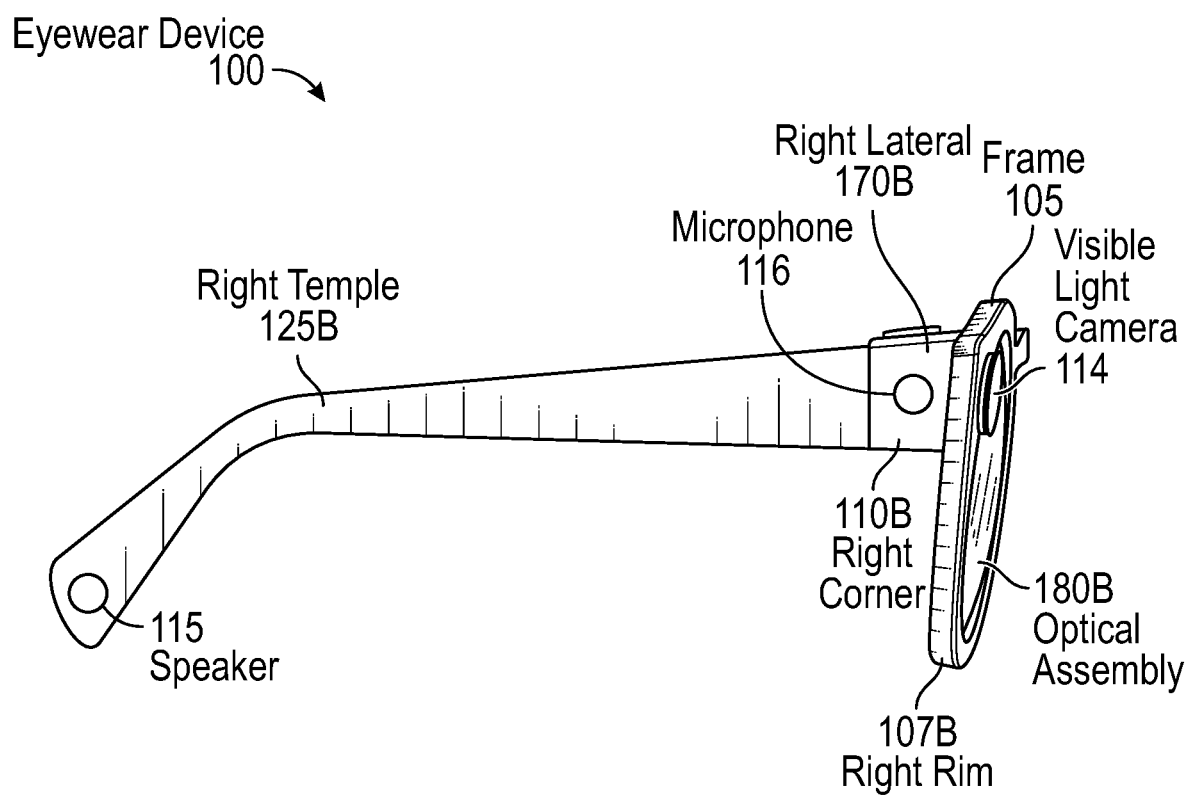
FIG. 1A is a side view of an example hardware configuration of an eyewear device, which includes a visible light camera on a corner and a speaker on a temple.

The following detailed description includes examples for viewing audio and visual content captured by others on a user's mobile device (e.g., a mobile eyewear device) based on where they were captured in relation to the location of the user's mobile device. This enables a user of a mobile device to see activity and detail in their vicinity—mimicking the functionality of high-powered binoculars and enabling the user to see content obstructed from the user's view from their current location (such as a performer on a stage inside a restaurant when the user is outside). In one example, content captured by others (or previously by the user) is tagged with location coordinates (e.g., GPS coordinates) and stored on a server. A mobile device of the user provides its current location to the server, which retrieves content corresponding to that location and sends it to the mobile device. The mobile device overlays icons associated with the content on a scene being viewed with the mobile device for selection by the user. Upon selection of an icon by the user, the device displays the associated content.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element. As used herein, the term "about" means±10% from the stated amount.

The orientations of the mobile devices, eyewear devices, associated components and any complete devices incorporating a camera such as shown in any of the drawings, are given by way of example only, for illustration and discussion purposes. In operation, for particular programming, devices may be oriented in any other direction suitable to the particular application, for example up, down, sideways, or any other orientation. Also, to the extent used herein, any directional term, such as front, rear, inward, outward, toward, left, right, lateral, longitudinal, up, down, upper, lower, top, bottom and side, are used by way of example only, and are not limiting as to direction or orientation of any camera or component of a camera constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to examples illustrated in the accompanying drawings and discussed below.

FIG. 1A depicts an example hardware configuration of a mobile device in the form of an eyewear device 100 for capturing and displaying content (e.g., visual content such as images and video, and audio content). The mobile device may take other forms such as a mobile phone or a tablet. Additionally, the eyewear device 100 can take other forms and may incorporate other types of frameworks, for example, a headgear, a headset, or a helmet. The eyewear device 100 includes at least one visible light camera 114 on a corner 110B for capturing images in a viewing area (e.g., field of view). The illustrated eyewear device 100 also includes a speaker 115 and a microphone 116.

The visible light camera 114 is sensitive to the visible light range wavelength. As shown in the example, the visible light camera 114 has a front facing field of view from the perspective of a wearer that is configured to capture images of a scene being viewed thought an optical assembly 180B. Examples of such a visible light camera 114 include a high-resolution complementary metal-oxide-semiconductor (CMOS) image sensor and a video graphic array (VGA) camera, such as 640p (e.g., 640×480 pixels for a total of 0.3 megapixels), 720p, or 1080p. The eyewear device 100 captures image sensor data from the visible light camera 114, and optionally other data such as geolocation data and audio data (via microphone 116), digitizes the data using one or more processors, and stores the digitized data in a memory. The term "field of view" is intended to describe the viewing area which the user of a mobile device can see with his or her eyes through optical assemblies 180 or on a display of a mobile device presenting information captured with the visible light camera 114.

Visible light camera 114 may be coupled to an image processor (element 312 of FIG. 3) for digital processing and adding of timestamp and location coordinates corresponding to when and where an image of a scene is captured. Image processor 312 includes circuitry to receive signals from the visible light camera 114 and process those signals from the visible light camera 114 into a format suitable for storage in memory (element 334 of FIG. 3). The timestamp can be added by the image processor 312 or other processor, which controls operation of the visible light camera 114. The image processor 312 may additionally add the location coordinates, e.g., received from a global positioning system (element 331 of FIG. 3).

The microphone 116 may be coupled to an audio processor (element 313 of FIG. 3) for digital processing and adding a timestamp indicating when audio is captured. The audio processor 313 includes circuitry to receive signals from the microphone 116 (or from memory) and process those signals into a format suitable for storage in the memory 334 and/or presentation by speaker 115. The timestamp can be added by the audio processor 313 or other processor, which controls operation of the speaker 115 and the microphone 116.

Figure 1B:
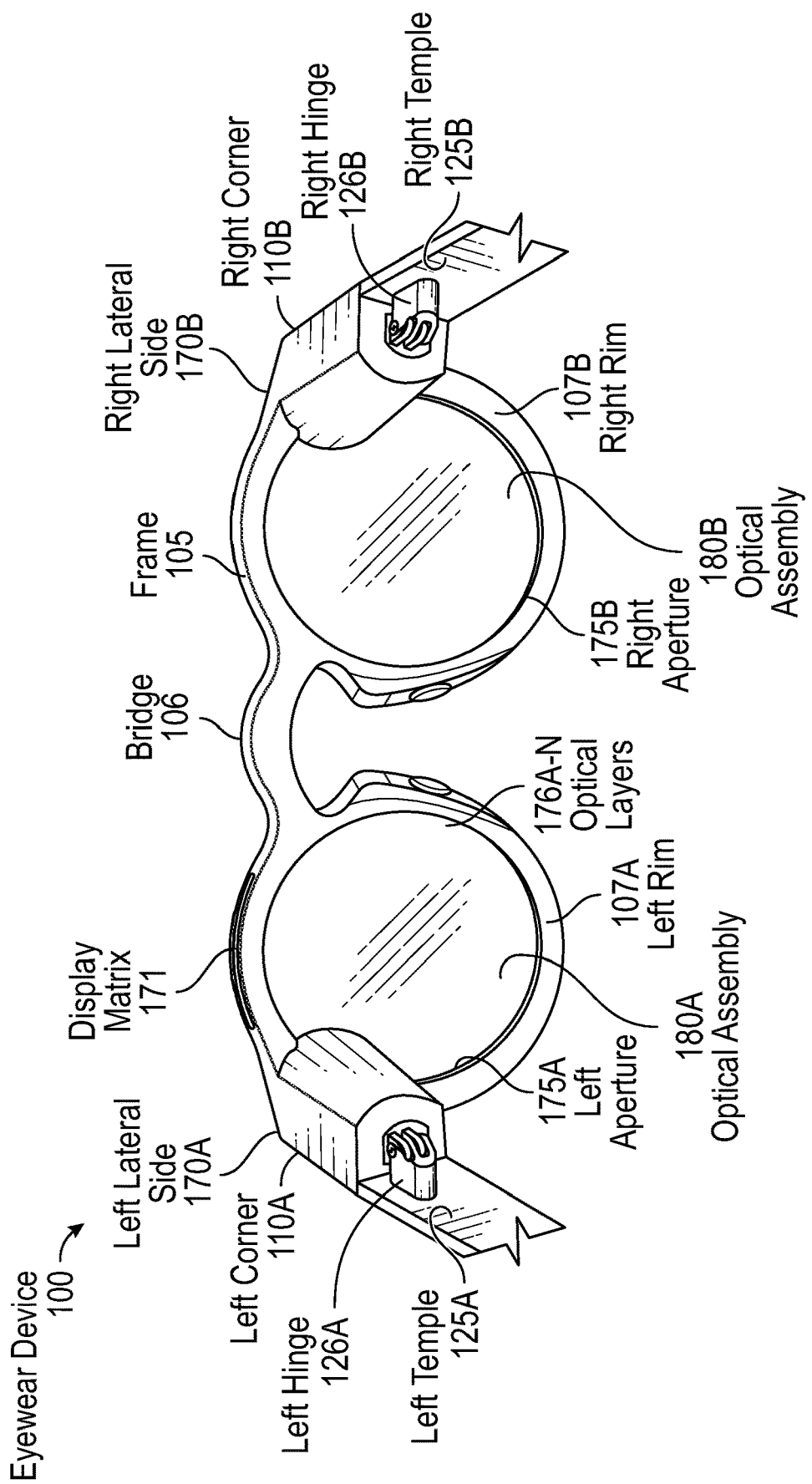
FIGS. 1B and 1C are rear views of example hardware configurations of the eyewear device of FIG. 1A, including two different types of image displays.
Figure 1C:
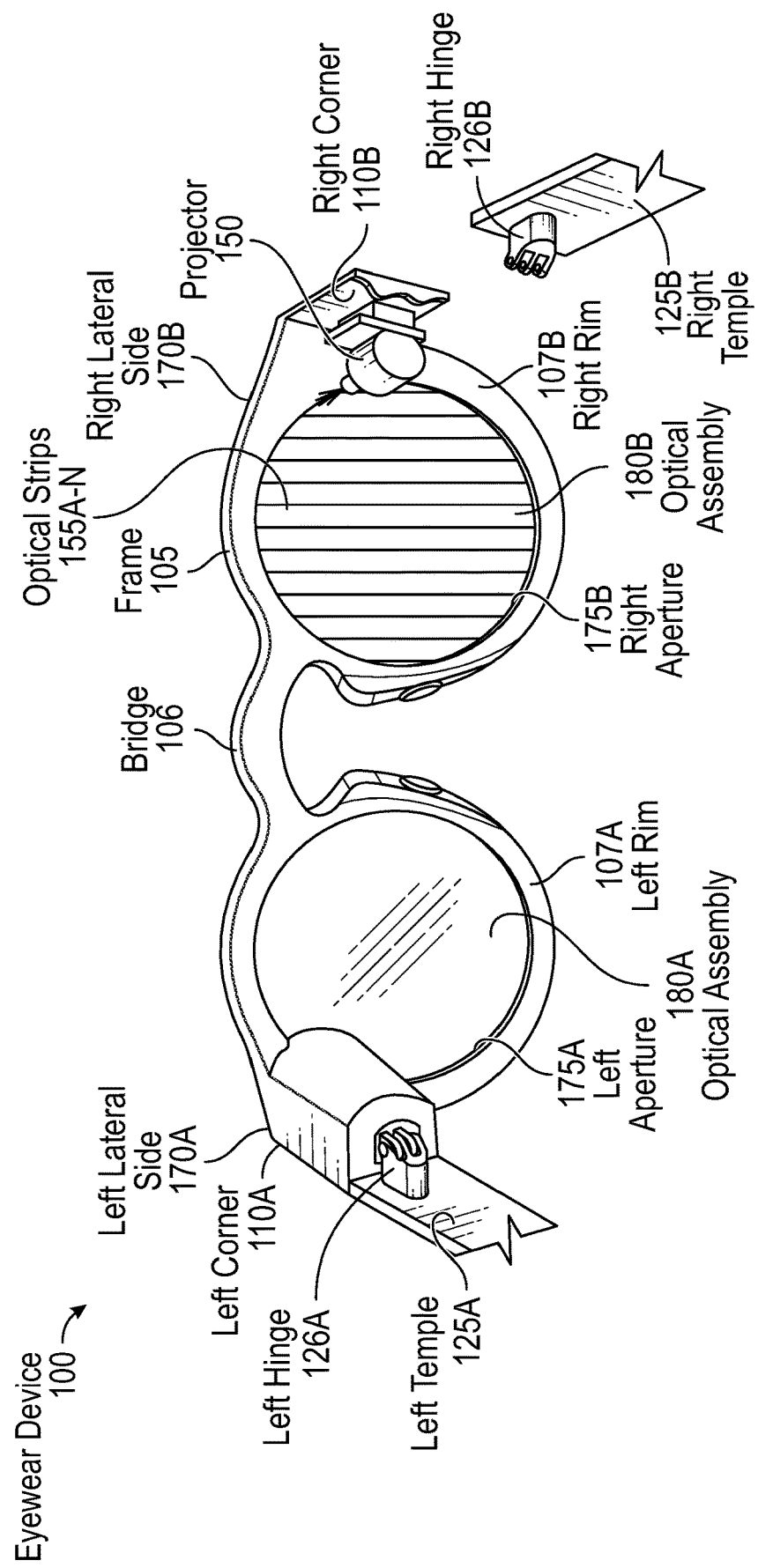

As shown in FIGS. 1A, 1B, and 1C, the eyewear device 100 includes a frame 105 having a left rim 107A connected to a right rim 107B via a bridge 106 adapted for a nose of the user. The left and right rims 107A-B include respective apertures 175A-B that hold a respective optical assembly 180A-B. Left and right temples 125A-B extend from respective lateral sides 170A-B of the frame 105, for example, via respective left and right corners 110A-B. Each temple 125A-B is connected to the frame 105 via a respective hinge 126A-B. A substrate or materials forming the frame 105, corners 110, and temples 125A-B can include plastic, acetate, metal, or a combination thereof. The corners 110A-B can be integrated into or connected to the frame 105 and/or temples 125A-B.

Although shown as having two optical assemblies 180A-B, the eyewear device 100 can include other arrangements, such as a single or three optical assemblies, or the optical assembly 180A-B may have a different arrangement depending on the application or intended user of the eyewear device 100.

In one example, such as depicted in FIG. 1B, each optical assembly 180A-B includes a display matrix 171 and an optical layer or layers 176A-N. The display matrix 171 may include a liquid crystal display (LCD), an organic light-emitting diode (OLED) display, or other such display. The optical layer or layers 176 may include lenses, optical coatings, prisms, mirrors, waveguides, optical strips, and other optical components in any combination. As used herein, the term lens is meant to cover transparent or translucent pieces of glass or plastic having curved and/or flat surfaces that cause light to converge/diverge or that cause little or no convergence or divergence.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 171, and the light that travels through the prism so that the image viewed from the second surface is larger in one or more dimensions than the image emitted from the display matrix 171.

In another example, such as depicted in FIG. 1C, the image display device of optical assembly 180A-B includes a projection image display. The illustrated projection image display includes a laser projector 150 (e.g., a three-color laser projector using a scanning mirror or galvanometer) disposed adjacent one of the corners 110A-B of the eyewear device 100 and optical strips 155A-N spaced apart across the width of the lens of the optical assembly 180A-B or across a depth of the lens between the front surface and the rear surface of the lens.

As the photons projected by the laser projector 150 travel across the lens of the optical assemblies 180A and 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, control specific photons or beams of light. In an example, a processor controls optical strips 155A-N by initiating mechanical, acoustic, or electromagnetic signals.

In one example, the produced visible output on the optical assembly 180A-B of the eyewear device 100 includes an overlay image that overlays at least a portion of the field of view through the optical assemblies 180A-B. In one example, the optical assemblies 180A-B are see-through displays that present the overlay image as an overlay on a scene (or features within a scene) that the wearer is viewing through the lenses of the optical assembly. In another example the optical assemblies 180A-B are not see-through displays (e.g., are opaque displays) that present the overlay image by combining the overlay with real-time images captured by the cameras 114 of the eyewear device for presentation to the user on the displays.

Figure 2A:
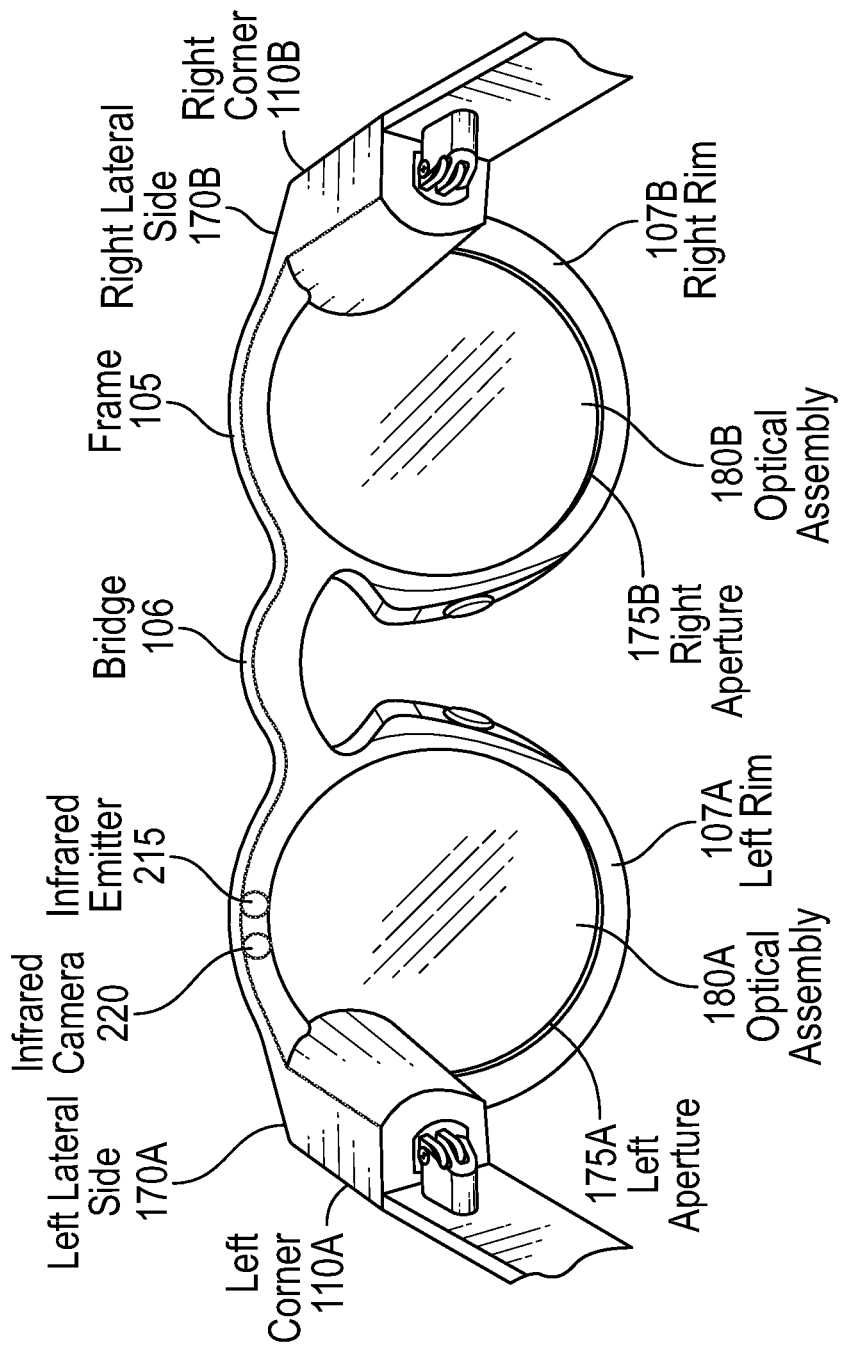
FIGS. 2A and 2B are rear views of example hardware configurations of the eyewear device of FIG. 1A, including eye movement tracking hardware.

FIG. 2A is a rear view of an example hardware configuration of the eyewear device 100, which includes an eye movement tracker 213 on the frame 105, for tracking the eye movement of the user of the eyewear device 100. The eye movement tracker 213 of the eyewear device 100 includes an infrared emitter 215 and an infrared camera 220. Visible light cameras typically include a blue light filter to block infrared light detection. In an example, the infrared camera 220 is a visible light camera, such as a low-resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right corners 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. In another example, the infrared emitter 215 is on the frame 105 and the infrared camera 220 is on one of the corners 110A-B, or vice versa.

The infrared emitter 215 can be connected essentially anywhere on the frame 105, left corner 110A, or right corner 110B to emit a pattern of infrared light 250 (FIG. 2C) on the eye 252 of the user. Similarly, the infrared camera 220 can be connected essentially anywhere on the frame 105, left corner 110A, or right corner 110B to capture at least one reflection variation 254 in the emitted pattern of infrared light from the eye of the user.

The infrared emitter 215 and infrared camera 220 are arranged to face inward toward the eye of the user with a partial or full angle of coverage of the eye in order to pick up an infrared image of the eye to track eye movement of the eye of the user. For example, the infrared emitter 215 and infrared camera 220 are positioned directly in front of the eye, in the upper part of the frame 105 or in the corners 110A-B at either ends of the frame 105. The eye movement includes a variation of eye direction on a horizontal axis, a vertical axis, or a combination thereof from the initial eye direction during presentation of the initial displayed image on the image display of optical assembly 180A-B.

Eye movement tracker 213 can track eye movement by measuring the point of eye gaze direction (where the user is looking in the optical assembly 180A-B of the eyewear device 100), comparing currently captured images to previously captured calibration images, or detecting motion of the eye relative to the head. For example, eye movement tracker 213 non-invasively measures eye motion utilizing video images from which the eye position is extracted. As noted above, a pattern of infrared light is emitted by the infrared emitter 215 and infrared light is reflected back from the eye with variations that are sensed and imaged by a video camera, such as infrared camera 220. Data forming the picked up infrared image is then analyzed to extract eye rotation from changes in the reflection variations. Such video-based eye movement trackers typically utilize corneal reflection (first Purkinje image) and the center of the pupil as features to track over time. In a second example, a dual-Purkinje eye movement tracker utilizes reflections from the front of the cornea (first Purkinje image) and the back of the lens (fourth Purkinje image) as features to track. In a third example, image features from inside the eye are tracked, such as the retinal blood vessels, and these features are followed as the eye of the user rotates.

Calibration of the eyewear device 100 based on the unique anatomical features of the eyes of the user may be performed before using the eye movement tracker 213 to track eye position. Generally, the user looks at a point or series of points, while the eye movement tracker 213 records the value that corresponds to each gaze position. Prior to presenting, via the image display of the optical assembly 180A-B, the initial displayed image, eyewear device 100 calibrates the eye movement tracker 213 by presenting, via the image display of optical assembly 180A-B, a series of calibration images for viewing by the eye of the user. Each of the calibration images has a respective point of interest at a respective known fixed position on the horizontal axis and the vertical axis. In response to the eye of the user viewing the respective point of interest, eyewear device 100 records, in an eye direction (e.g., scanpath) database, anatomical feature positions of the eye in relation to the respective known fixed position of the respective point of interest.

After calibration, the video-based eye movement tracker 213 can focus on one or both eyes of the user and records eye movement as the user (e.g., wearer of the eyewear device 100) looks at the image display of optical assembly 180A-B. When infrared or near-infrared non-collimated light is shined on the pupil of the eye as the pattern of infrared light by the infrared emitter 215, corneal reflections are generated in the reflection variations of infrared light. The vector between the pupil center and the corneal reflections in the captured infrared images contain the reflection variations of infrared light and can be used to compute the point of regard on surface or the eye gaze direction.

Two general types of infrared and near-infrared (also known as active light) eye movement tracking techniques can be utilized: bright-pupil and dark-pupil. Whether bright-pupil or dark-pupil is utilized depends on the location of the illumination source (infrared emitter 215) with respect to the infrared camera 220 and the eye of the user. If the illumination from the infrared emitter 215 is coaxial with the optical path, then the eye acts as a retroreflector as the light reflects off the retina generating a bright pupil effect similar to red eye. If the illumination from the infrared emitter 215 is offset from the optical path, then the pupil appears dark because the retro reflection from the retina is directed away from the infrared camera 220.

In one example, the infrared emitter 215 of the eye movement tracker 213 emits infrared light illumination on the user's eye, which can be near-infrared light or other short-wavelength beam of low-energy radiation. Alternatively, or additionally, the eye movement tracker 213 may include an emitter that emits other wavelengths of light besides infrared and the eye movement tracker 213 further includes a camera sensitive to that wavelength that receives and captures images with that wavelength. For example, the eye movement tracker 213 may comprise a visible light camera that captures light in the visible light range from the eye, such as a red, green, and blue (RGB) camera.

As noted above, the eyewear device 100 is coupled to a processor and a memory, for example in the eyewear device 100 itself or another part of the system. Eyewear device 100 or the system can subsequently process images captured of the eye, for example, a coupled memory and processor in the system to process the captured images of the eye to track eye movement. Such processing of the captured images establishes a scanpath to identify movement of the user's eye. The scanpath includes the sequence or series of eye movements based on captured reflection variations of the eye. Eye movements are typically divided into such fixations and saccades—when the eye gaze pauses in a certain position, and when it moves to another position, respectively. The resulting series of fixations and saccades is called the scanpath. Smooth pursuit describes the eye following a moving object. Fixational eye movements include micro saccades: small, involuntary saccades that occur during attempted fixation. The scanpaths are then utilized to determine the field of view adjustment.

An eye direction database can be established during calibration. Since the known fixed position of the respective point of interests during calibration are known, that scanpath database can be used to establish similarities to the previously calibration images. Because the known fixed position of the point of interest is known when the calibration image and is recorded in the eye direction database, the eyewear device 100 can determine where the eye of the user is looking by comparing currently captured images of the eye with the eye direction database. The calibration image(s) which most closely resembles the currently captured image can have the known fixed position of the point of interest utilized as a good approximation of the eye direction for the currently captured image.

Figure 2B:
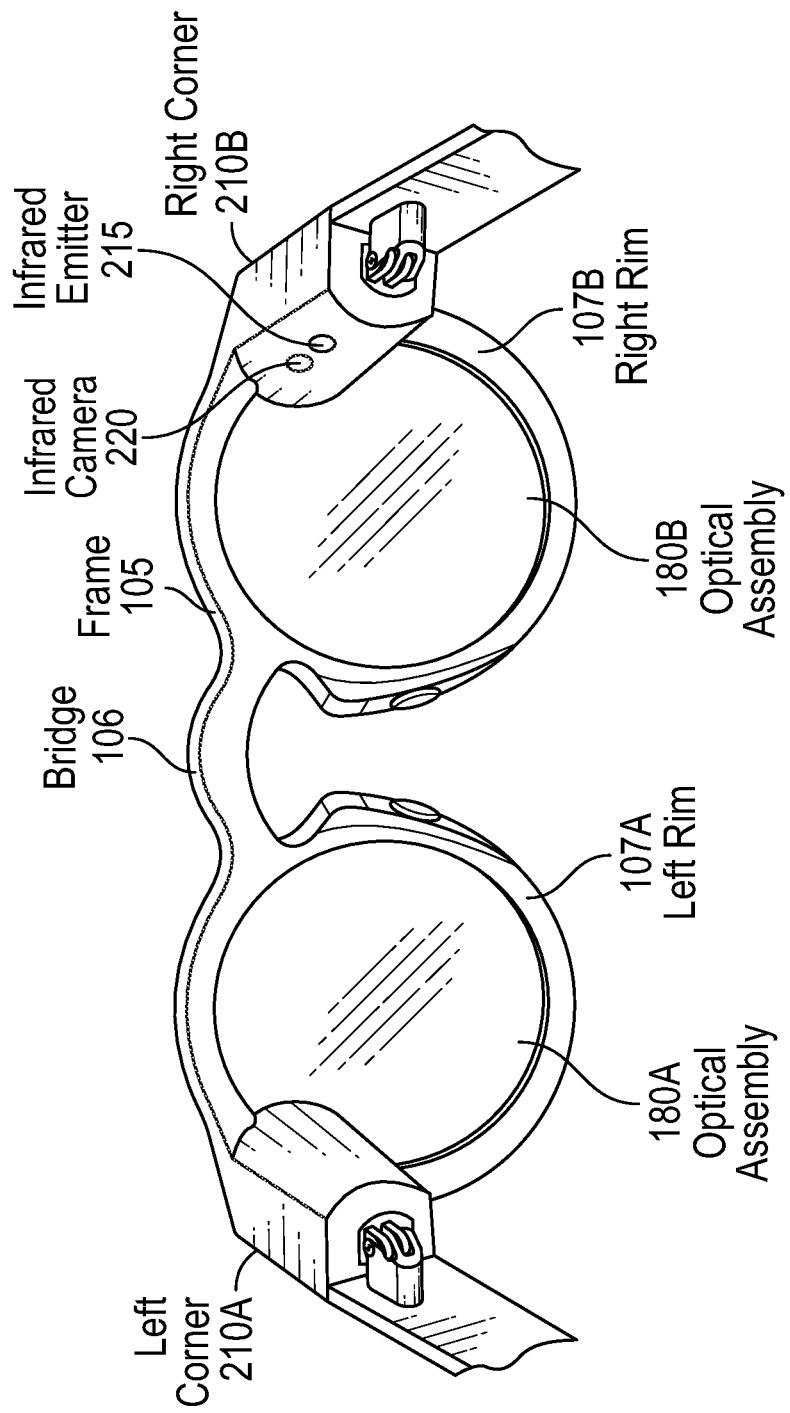
Figure 2C:
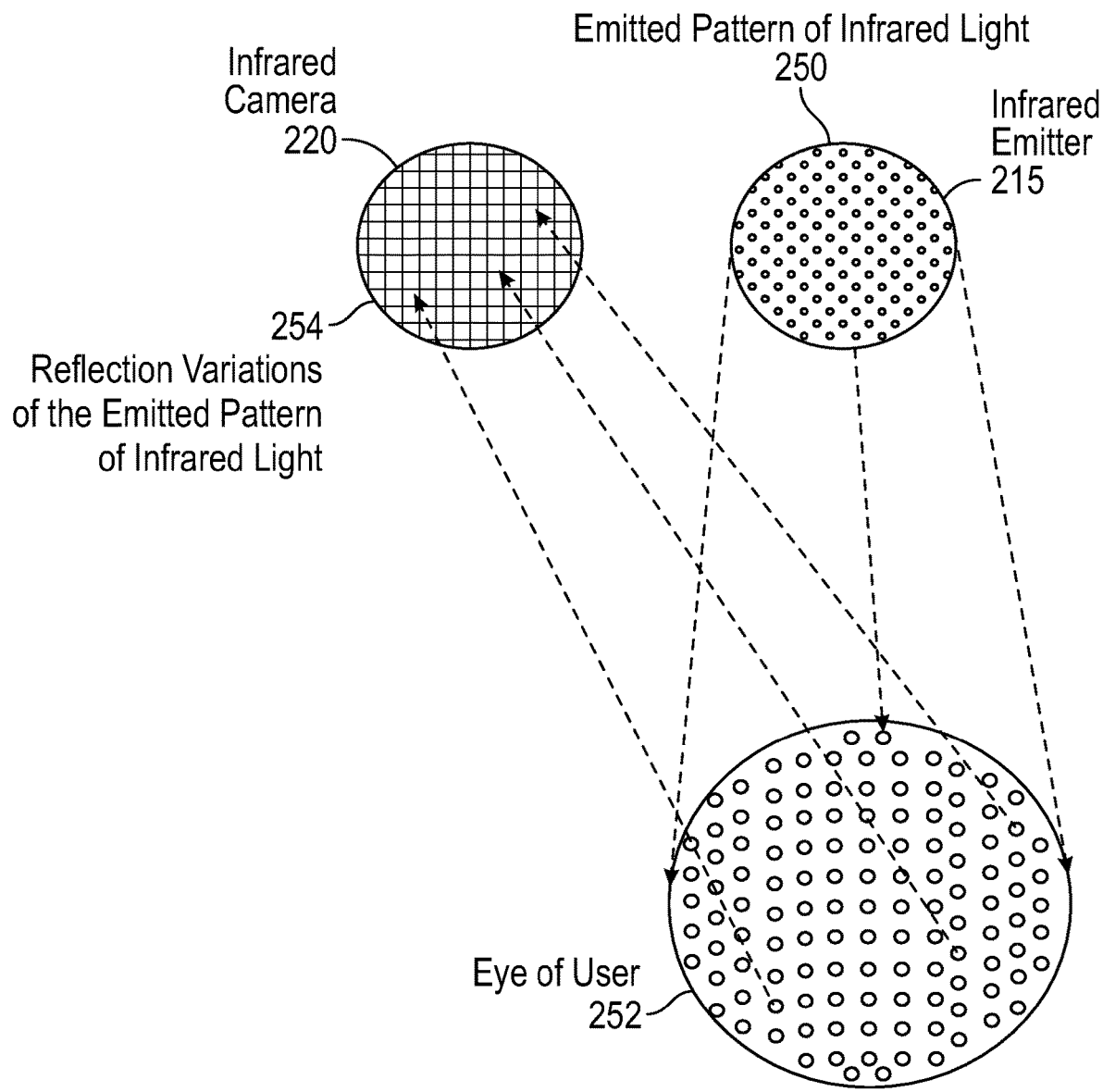
FIG. 2C is an illustration depicting a technique for tracking eye movement.

FIG. 2B is a rear view of an example hardware configuration of another eyewear device 200. In this example configuration, the eyewear device 200 is depicted as including an eye movement tracker 213 on a right corner 210B for tracking the eye movement of the user of the eyewear device. As shown, the infrared emitter 215 and the infrared camera 220 are co-located on the right corner 210B. The eye movement tracker 213 or one or more components of the eye movement tracker 213 can alternatively or additionally be located on the left corner 210A and other locations of the eyewear device 200, for example, the frame 105. Eye movement tracker 213 has an infrared emitter 215 and infrared camera 220 like that of FIG. 2A, but the eye movement tracker 213 can be varied to be sensitive to different light wavelengths as described previously in FIG. 2A.

Figure 2D:
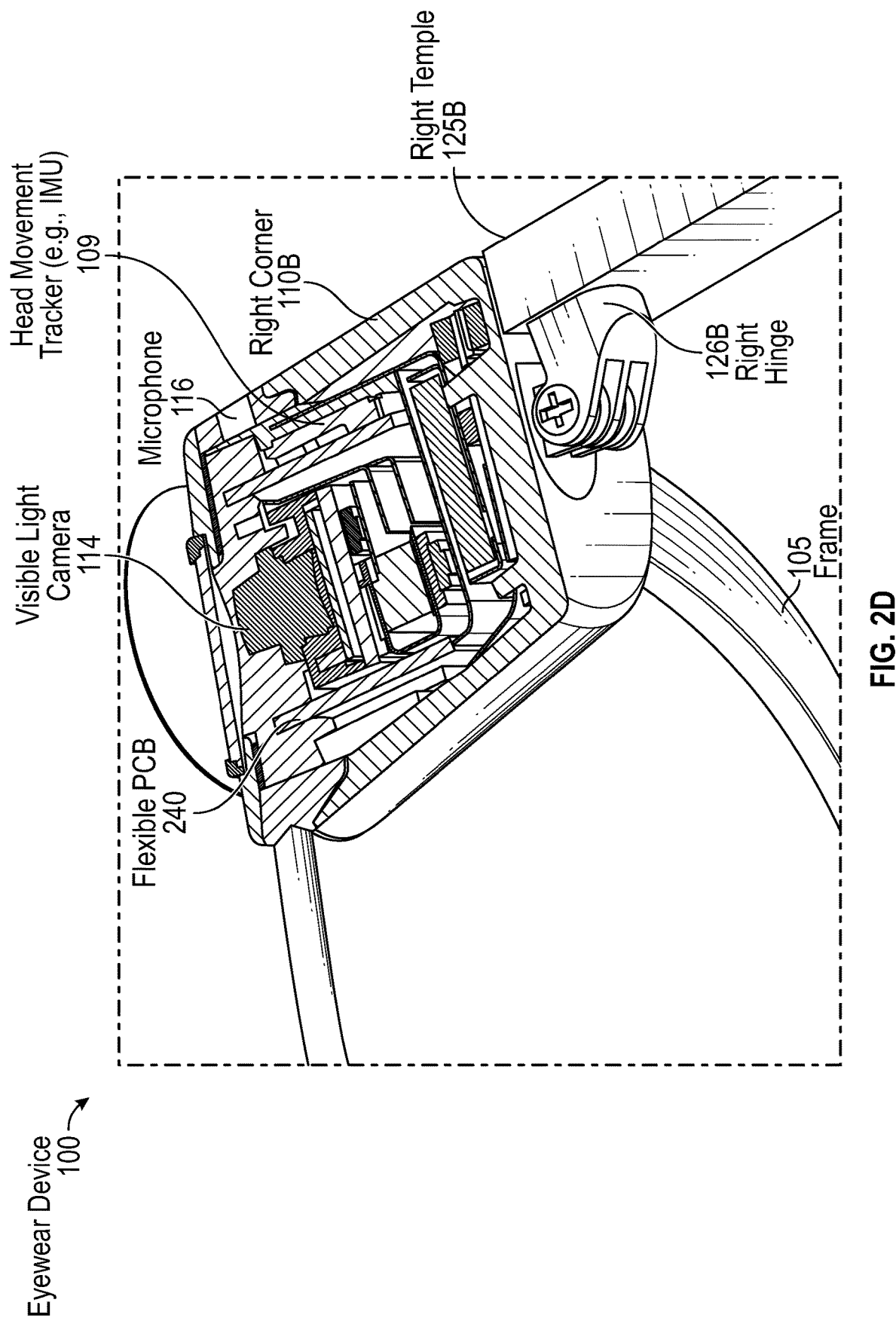
FIG. 2D is a top cross-sectional view of a corner of the eyewear device of FIG. 1A depicting the visible light camera, a head movement tracker, and a circuit board.

FIG. 2D is a top cross-sectional view of the corner of the eyewear device 100 of FIG. 1A depicting the right visible light camera 114, a head movement tracker 109, and a microphone 116. Construction and placement of a left visible light camera is substantially similar to the right visible light camera 114, except the connections and coupling are on the left lateral side 170A. As shown, the eyewear device 100 includes a circuit board, which may be a flexible printed circuit board (PCB) 240. The right hinge 126B connects the right corner 110B to a right temple 125B of the eyewear device 100. In some examples, components of the right visible light camera 114, the flexible PCB 240, or other electrical connectors or contacts may be located on the right temple 125B or the right hinge 126B.

The head movement tracker 109 includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

The right corner 110B includes corner body 110B and a corner cap, with the corner cap omitted in the cross-section of FIG. 2D. Disposed inside the right corner 110B are various interconnected circuit boards, such as PCBs or flexible PCBs, that include controller circuits for right visible light camera 114, microphone(s), low-power wireless circuitry (e.g., for wireless short range network communication via Bluetooth™), high-speed wireless circuitry (e.g., for wireless local area network communication via WiFi).

Flexible PCB 240 is disposed inside the right corner 110B and is coupled to one or more other components housed in the right corner 110B. Although shown as being formed on the circuit boards of the right corner 110B, the right visible light camera 114B can be formed on the circuit boards of the left corner 110A, the temples 125A-B, or frame 105.

Figure 3:
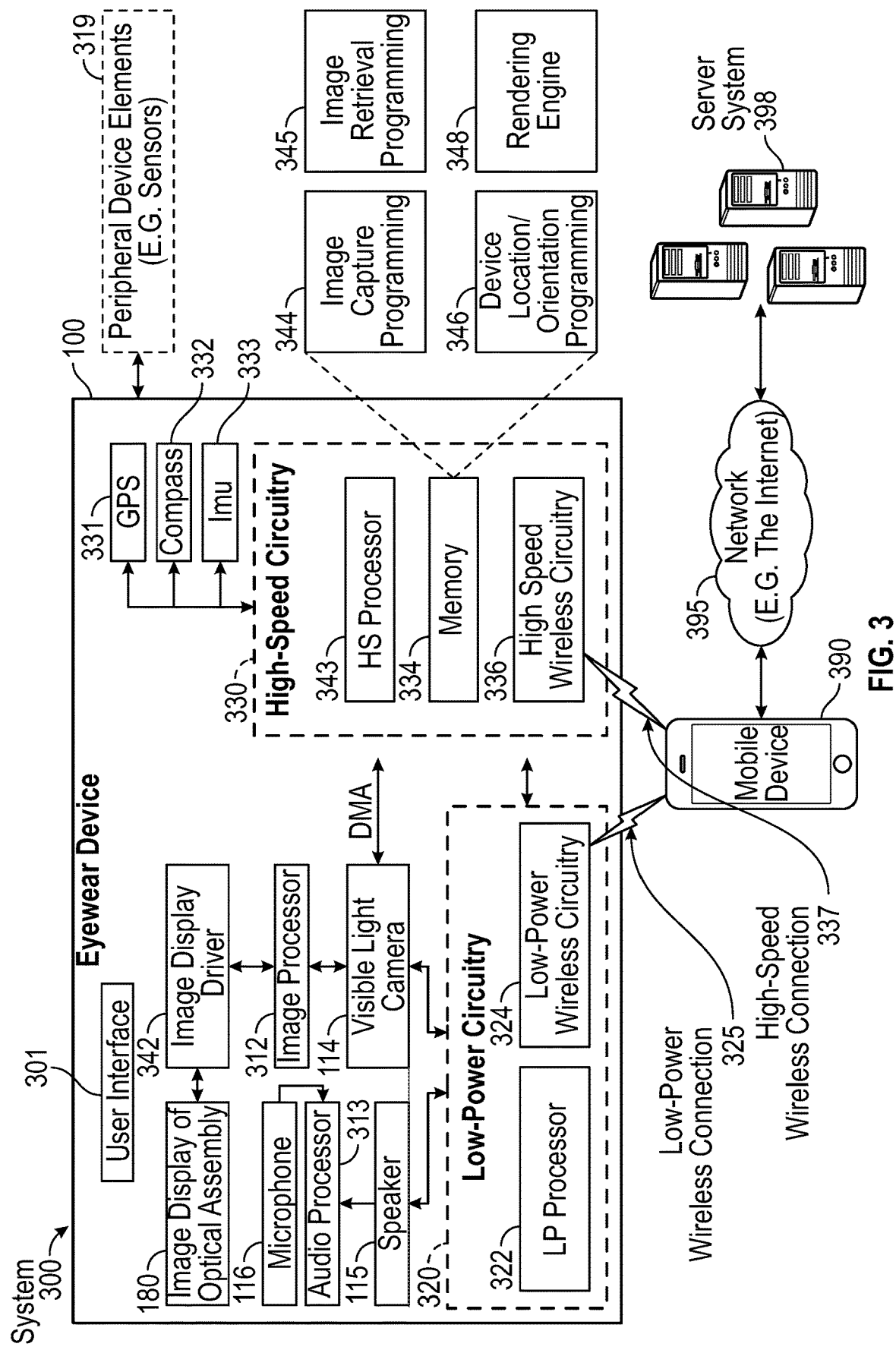
FIG. 3 is a high-level functional block diagram of an example image selection and display system including the eyewear device, a mobile device, and a server system connected via various networks.

FIG. 3 is a high-level functional block diagram of an example image selection and display system 300. The image selection and display system 300 includes a mobile device, which is the eyewear device 100 in the example. The mobile device can communicate via one or more wireless networks or wireless links with other mobile devices 390 or server systems 398. The image selection and display system 300 further includes the other mobile devices 390 and server systems 398. A mobile device 390 may be a smartphone, tablet, laptop computer, access point, or other such device capable of connecting with eyewear device 100 using, for example, a low-power wireless connection 325 and a high-speed wireless connection 337. The mobile device 390 is connected to the server system 398 via the network 395. The network 395 may include any combination of wired and wireless connections.

The eyewear device 100 includes and supports a visible light camera 114, a speaker 115, a microphone 116, a user interface 301, an image display of the optical assembly 180, image display driver 342, image processor 312, audio processor 313, low-power circuitry 320, and high-speed circuitry 330. The components shown in FIG. 3 for the eyewear device 100 are located on one or more circuit boards, for example a PCB or flexible PCB, in the temples. Alternatively, or additionally, the depicted components can be located in the corners, frames, hinges, or bridge of the eyewear device 100. Memory 334 includes image capture programming 344, image retrieval programming 345, and device location/orientation programming 346 to perform the functions described herein for image selection and display. Memory 334 additionally includes a rendering engine 348 for rendering overlay images on the displays 180A and 180B using image processor 312 and image display driver 342.

Image capture programming 344 implements instructions to cause the eyewear device 100 to capture, via the visible light camera 114, image(s) of a scene and to add time stamp and location coordinates. Image retrieval programming 345 implements instructions to cause the eyewear device 100 to request images from the server system 398 or memory 334 based on the location where the images were captured in relation to the current location of the eyewear device 100. Device location/orientation programming 346 implements instructions to cause the eyewear device 100 to determine the current location of the eyewear device 100 and to determine the orientation of the eyewear device (e.g., to determine the field of view through the optical assemblies 180).

As shown in FIG. 3, high-speed circuitry 330 includes high-speed processor 343, memory 334, and high-speed wireless circuitry 336. In an example, the image display driver 342 is operated by the high-speed processor 343 in order to drive the image display of the optical assembly 180. High-speed processor 343 may be any processor capable of managing high-speed communications and operation of any general computing system needed for eyewear device 100. High-speed processor 343 includes processing resources needed for managing high-speed data transfers on high-speed wireless connection 337 to a wireless local area network (WLAN) using high-speed wireless circuitry 336. In some examples, the high-speed processor 343 executes an operating system such as a LINUX operating system or other such operating system of the eyewear device 100 and the operating system is stored in memory 334 for execution. In addition to any other responsibilities, the high-speed processor 343 executes a software architecture for the eyewear device 100 to manage data transfers with high-speed wireless circuitry 336. In some examples, high-speed wireless circuitry 336 is configured to implement Institute of Electrical and Electronic Engineers (IEEE) 802.11 communication standards, also referred to herein as WiFi. In other examples, high-speed wireless circuitry 336 implements other high-speed communications standards.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes a storage device capable of storing various data and applications, including, among other things, camera data generated by the visible light camera 114 and the image processor 312, as well as images generated for display by the image display driver 342 on the image display of the optical assembly 180 and audio data generated by the microphone 116 and the audio processor 313. While memory 334 is shown as integrated with high-speed circuitry 330, in other examples, memory 334 may be an independent standalone element of the eyewear device 100. In some examples, electrical routing lines may provide a connection through a chip that includes the high-speed processor 343 from the image processor 312/audio processor 313 or low-power processor 324 to the memory 334. In other examples, the high-speed processor 343 may manage addressing of memory 334 such that the low-power processor 324 will boot the high-speed processor 343 any time that a read or write operation involving memory 334 is needed.

Eyewear device 100 further includes a global positioning system 331, a compass 332, and an inertial measurement unit 333. GPS 331 is a receiver for use in a satellite-based radio navigation system that receives geolocation and time information from GPS satellites. Compass 332 provides direction relative to geographic cardinal directions (or points). IMU 333 is an electronic device that measures and reports a force, angular rate, and/or orientation using a combination of accelerometers, gyroscopes, and/or magnetometers.

Eyewear device 100 may connect with a host computer. For example, the eyewear device 100 may pair with the mobile device 390 via the high-speed wireless connection 337 or connected to the server system 398 via the network 395. In one example, eyewear device 100 captures, via the camera 114, image of a scene and sends the images (along with location and timestamp information) to the host computer for forwarding to server system 398. In another example, the eyewear device 100 receives images and/or instructions from the host computer.

The eyewear device 100 further includes other output component and input components. The other output components include acoustic components (e.g., speakers 115), haptic components (e.g., a vibratory motor), and other signal generators. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Image selection and display system 300 may optionally include additional peripheral device elements 319. Such peripheral device elements 319 may include biometric sensors, additional sensors, or display elements integrated with eyewear device 100. For example, peripheral device elements 319 may include any I/O components including output components, motion components, position components, or any other such elements described herein.

For example, the biometric components of the image selection and display system 300 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

In one example, image processor 312 comprises a microprocessor integrated circuit (IC) customized for processing image sensor data from the visible light camera 114, along with volatile memory used by the microprocessor to operate. In order to reduce the amount of time that image processor 312 takes when powering on to processing data, a non-volatile read only memory (ROM) may be integrated on the IC with instructions for operating or booting the image processor 312. This ROM may be minimized to match a minimum size needed to provide basic functionality for gathering sensor data from visible light camera 114, such that no extra functionality that would cause delays in boot time are present. The ROM may be configured with direct memory access (DMA) to the volatile memory of the microprocessor of image processor 312. DMA allows memory-to-memory transfer of data from the ROM to system memory of the image processor 312 independent of operation of a main controller of image processor 312. Providing DMA to this boot ROM further reduces the amount of time from power on of the image processor 312 until sensor data from the visible light camera 114 can be processed and stored. In some examples, minimal processing of the camera signal from the visible light camera 114 is performed by the image processor 312, and additional processing may be performed by applications operating on the mobile device 390 or server system 398.

Low-power circuitry 320 includes low-power processor 322 and low-power wireless circuitry 324. These elements of low-power circuitry 320 may be implemented as separate elements or may be implemented on a single IC as part of a system on a single chip. Low-power processor 324 includes logic for managing the other elements of the eyewear device 100. Low-power processor 324 is configured to receive input signals or instruction communications from mobile device 390 via low-power wireless connection 325. Additional details related to such instructions are described further below. Low-power wireless circuitry 324 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 324. In other examples, other low power communication systems may be used.

Figure 4:
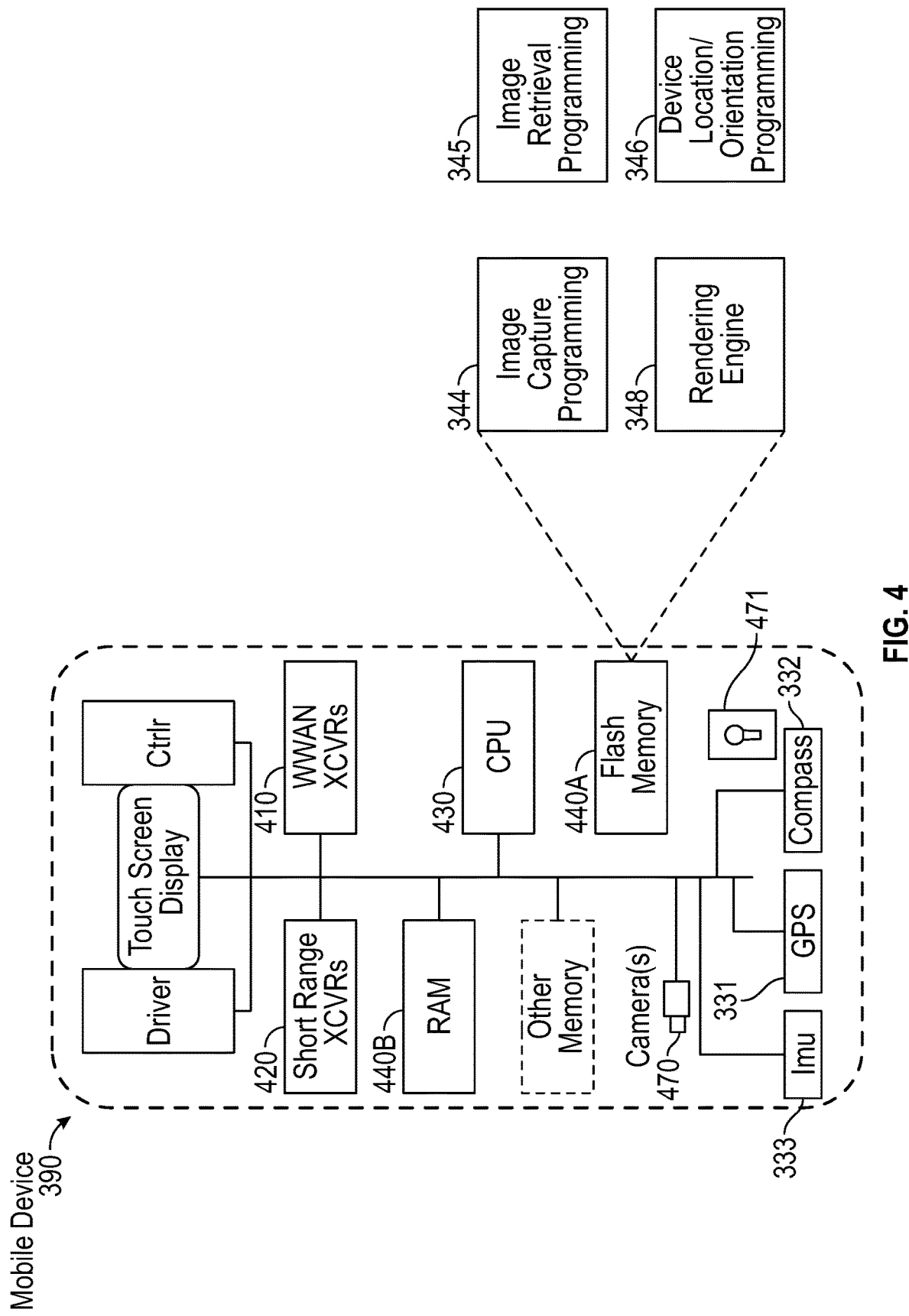
FIG. 4 shows an example of a hardware configuration for the mobile device in simplified block diagram form.

Mobile device 390 and elements of network 395, low-power wireless connection 325, and high-speed wireless architecture 337 may be implemented using details of the architecture of mobile device 390, for example utilizing the short range XCVRs and WWAN XCVRs of mobile device 390 described in FIG. 4.

FIG. 4 is a high-level functional block diagram of an example of a mobile device 390 that provides processing for the image selection and display system 300 of FIG. 3. Shown are elements of a touch screen type of mobile device 390 having image capture programming 344, image retrieval programming 345, and device location/orientation programming 346 loaded along with other applications such as a chat application. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides a block diagram illustration of the example mobile device 390 having a touch screen display for displaying content and receiving user input as (or as part of) the user interface. Mobile device 390 also includes a camera(s) 470, such as visible light camera(s), and a microphone 471.

As shown in FIG. 4, the mobile device 390 includes at least one digital transceiver (XCVR) 410, shown as WWAN XCVRs, for digital wireless communications via a wide area wireless mobile communication network. The mobile device 390 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390, the mobile device 390 can include a global positioning system (GPS) receiver 331. Alternatively, or additionally the mobile device 390 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 420. Additionally, mobile device 390 can include a compass 332 and an inertial measurement unit 333 for determining direction information.

The transceivers 410, 420 (network communication interfaces) conform to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 for user authorization strategies.

The mobile device 390 further includes a microprocessor, shown as CPU 430. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 430 or processor hardware in smartphone, laptop computer, and tablet.

The microprocessor 430 serves as a programmable host controller for the mobile device 390 by configuring the mobile device 390 to perform various operations, for example, in accordance with instructions or programming executable by processor 430. For example, such operations may include various general operations of the mobile device, as well as operations related to determining the location of the device when an image is captured and determining the location and orientation of the device when generating and presenting image overlays. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 440A and a random access memory (RAM) 440B. The RAM 440B serves as short term storage for instructions and data being handled by the processor 430, e.g., as a working data processing memory. The flash memory 440A typically provides longer term storage.

Depending on the type of device, the mobile device 390 stores and runs a mobile operating system through which specific applications, which may include image capture programming 344, image retrieval programming 345, device location/orientation programming 346, and rendering engine 348, are executed. However, in some implementations, programming may be implemented in firmware or a combination of firmware and an application layer. For example, the instructions to capture the image of the scene, track positional and orientation information of the device, and generate an overlay may reside in firmware (e.g., with a dedicated GPU or VPU SOC). Instructions to produce the visible output to the user may reside in an application. Applications, like the audio visualizer programming 344 and other applications, may be a native application, a hybrid application, or a web application (e.g., a dynamic web page executed by a web browser) that runs on mobile device 390. Examples of mobile operating systems include Google Android, Apple iOS (I-Phone or iPad devices), Windows Mobile, Amazon Fire OS, RIM BlackBerry operating system, or the like.

FIGS. 5A, 5B, 5C, 5D, 5E, and 5F are flowcharts 500, 505, 520, 530, 532, and 536, respectively, illustrating example operation of a mobile device (e.g., an eyewear device 100) or a mobile device 390 and other components of the image selection and display system 300. Although shown as occurring serially, one or more of the blocks in flow charts 500, 505, 520, 530, 532, and/or 536 may be reordered or parallelized depending on the implementation.

The flowcharts are described below with reference to an example where the mobile device is an eyewear device 100 that captures and presents images. It is understood that the functionality described with reference to the eyewear device 100 may be performed by other eyewear devices and other mobile devices such as mobile phones and tablets. Suitable modifications for implementation of the following with other mobile devices (including those with see through displays and those with non-see through displays such as touchscreens) will be readily understood from the description herein.

Figure 5A:
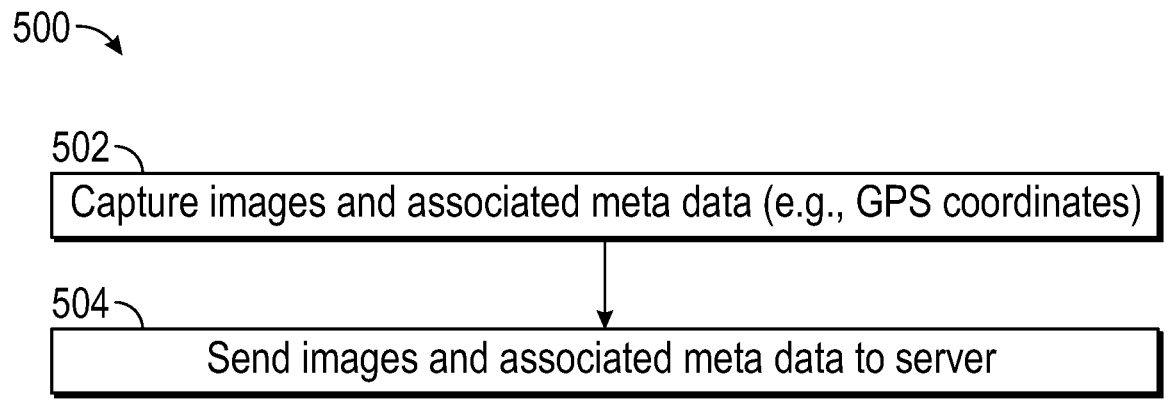
FIGS. 5A and 5B are flowcharts of example steps for capturing and distributing images for use in the image selection and display system of FIG. 3.

With reference to flow chart 500 of FIG. 5A, at block 502, the eyewear device 100 captures content (e.g., images, audio, and associated meta data). The eyewear device 100 captures images, e.g., using visible light camera 114, and stores the images in memory 334. Additionally, the eyewear device 100 captures location coordinates and timestamp information, e.g., using GPS 331 and image processor 312, and stores the location coordinates and timestamp information in memory 334. The eyewear device 100 stores the location coordinates and timestamp information as meta data associated with the respective images it captures. The images, audio, and meta data are captured by many mobile devices throughout the physical world.

At block 504, the eyewear device 100 sends the images and associated meta data to the server 398. The eyewear device 100 (and other mobile devices) sends the images and meta data captured at block 502 to the server system 398, e.g., through network 395 and optionally mobile device 390, for aggregation and central storage.

Figure 5B:
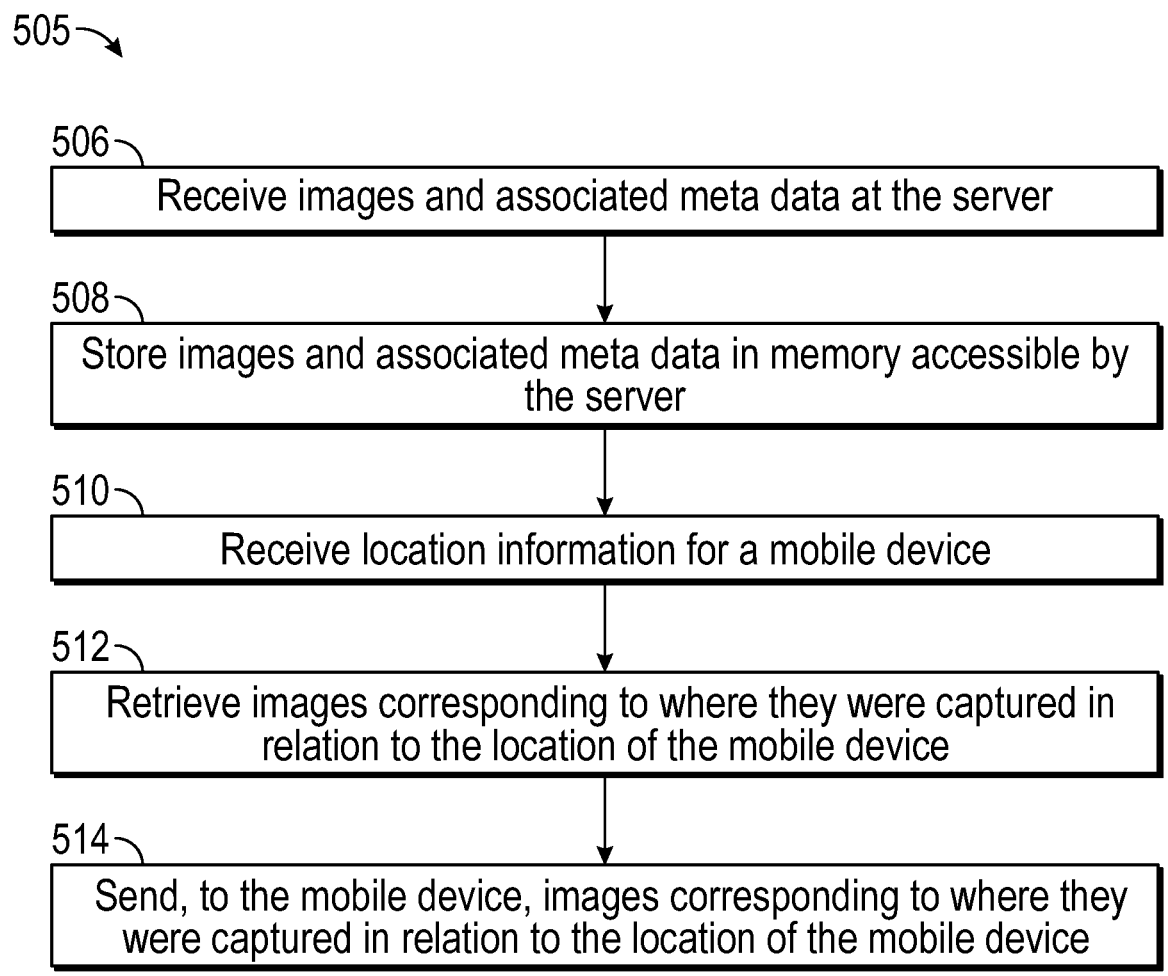

With reference to flow chart 505 of FIG. 5B, at block 506, the server 398 receives the images and meta data and, at block 508, the server 398 stores the received images and meta data. In an example, the server 398 receives and stores images and meta data from millions of mobile devices. As such, the server 398 generates a repository of images for later retrieval by the mobile devices.

At block 510, the server 398 receives location coordinates for the eyewear device 100. In an example, the server 398 receives GPS position location coordinates from the eyewear device 100. The server 398 may receive location coordinates via network 395 and optionally mobile device 390.

At block 512, the server 398 retrieves images from memory corresponding to where they were captured in relation to the location coordinates of the eyewear device 100. In an example, the server identifies a coordinate range surrounding the location coordinates of the eyewear device 100 that includes, for example, all GPS coordinates within a half mile of the GPS location coordinates received from the mobile device representing the current position of the eyewear device 100. The server 398 then identifies all images having location coordinates meta data that are within the coordinate range surrounding the location coordinates of the eyewear device 100.

At block 514, the server 398 sends to the eyewear device 100 the images corresponding to where they were captured in relation to the location coordinates of the eyewear device 100. In an example, the server 398 organizes the images chronologically and based on distance from the eyewear device 100 such that recent images that are relatively close to the current position of the eyewear device 100 are sent before older images and/or images with meta data indicating a location that is relatively far away.

Figure 5C:
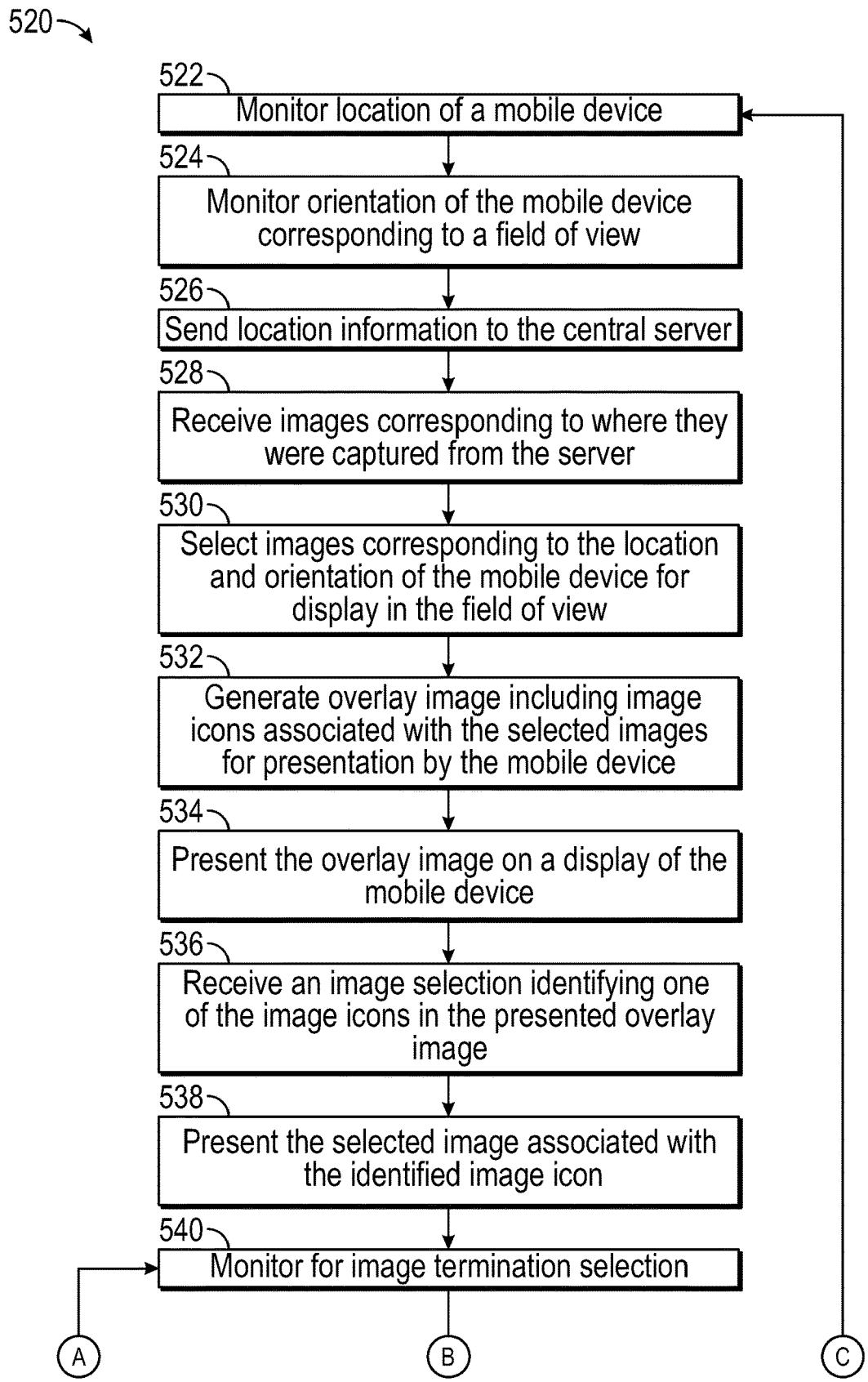
FIGS. 5C, 5D, 5E, and 5F are flowcharts of example steps for presenting image overlays for use in the image selection and display system of FIG. 3.
Figure 5C:
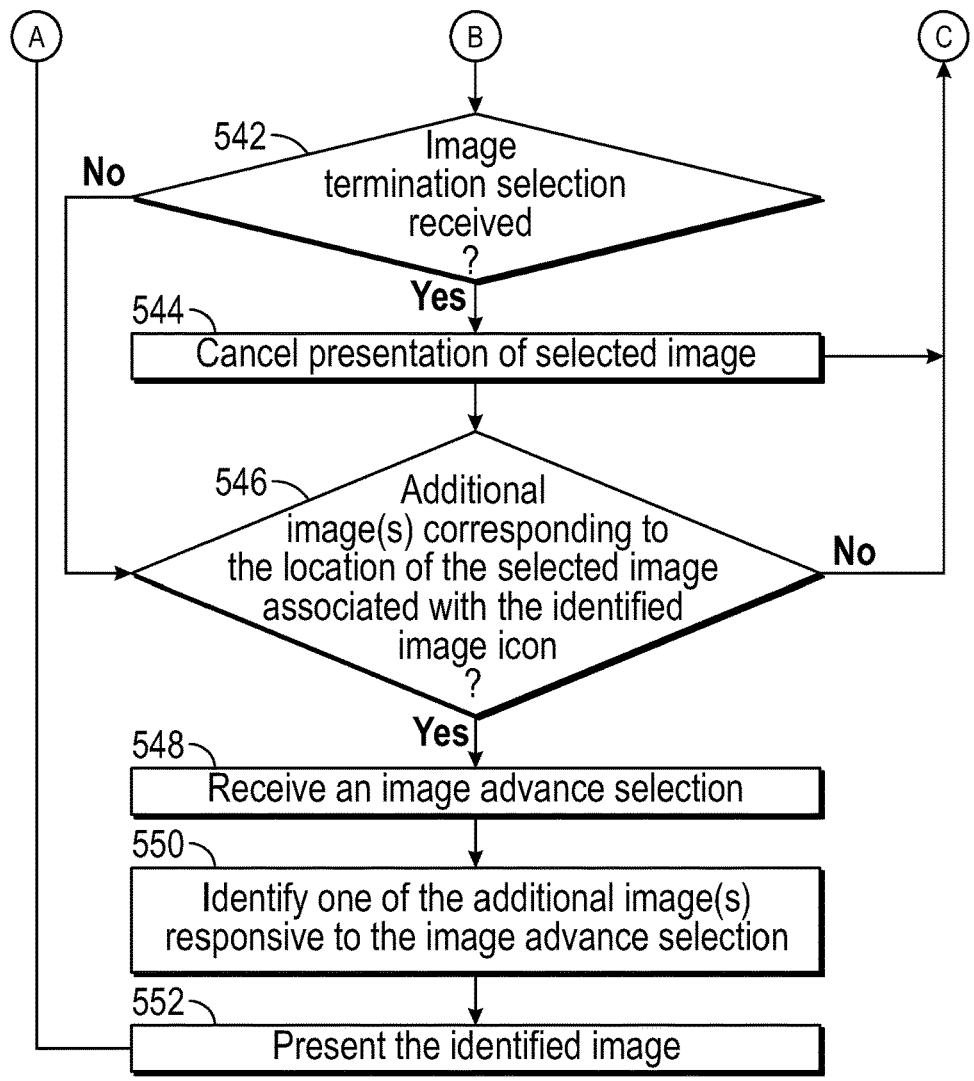

With reference to flow chart 520 of FIG. 5C, at block 522, the eyewear device 100 monitors its location. The eyewear device 100 may monitor its location using GPS 331. Location coordinates monitored by the eyewear device may be used to capture location coordinates meta data being added to images sent to the server 398 and as described below for retrieving and displaying content.

At block 524, the eyewear device 100 monitors its orientation corresponding to a field of view. The eyewear device 100 field of view is a view seen through the optical elements (assuming see-through displays). The eyewear device 100 monitors its orientation in three-dimensional space (e.g., two axes X and Y or three axes X, Y, and Z) and rotation about one or more axes (e.g., pitch, yaw, and/or roll). The eyewear device 100 may use various sensors to monitor its orientation, e.g., the compass 332 to determine direction and the IMU 333 to determine orientation. In an example, where a tablet is a mobile device, the field of view is the image viewed on a screen that is substantially simultaneously being captured by a visible light camera of the tablet.

At block 526, the eyewear device 100 sends its location coordinates (monitored at block 522) to the server 398. The eyewear device 100 send its location coordinates to the server system 398 through, for example, network 395 and optionally mobile device 390.

At block 528, the eyewear device 100 receives images corresponding to its location from the server 398 (which determines images as described with reference to block 512). The eyewear device 100 receives images from the server system 398 through, for example, network 395 and optionally mobile device 390.

Figure 5D:
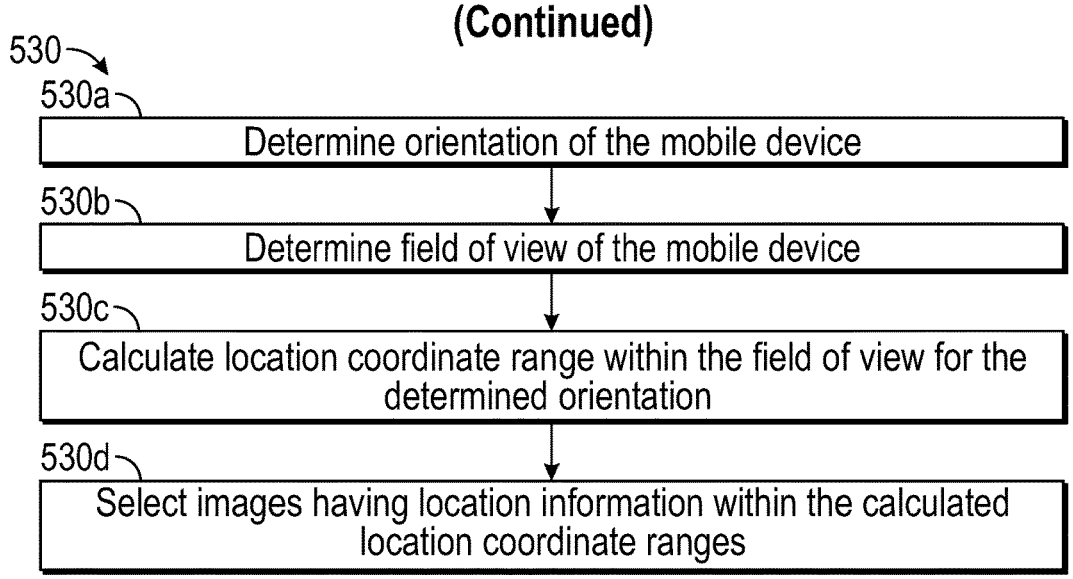
Figure 5E:
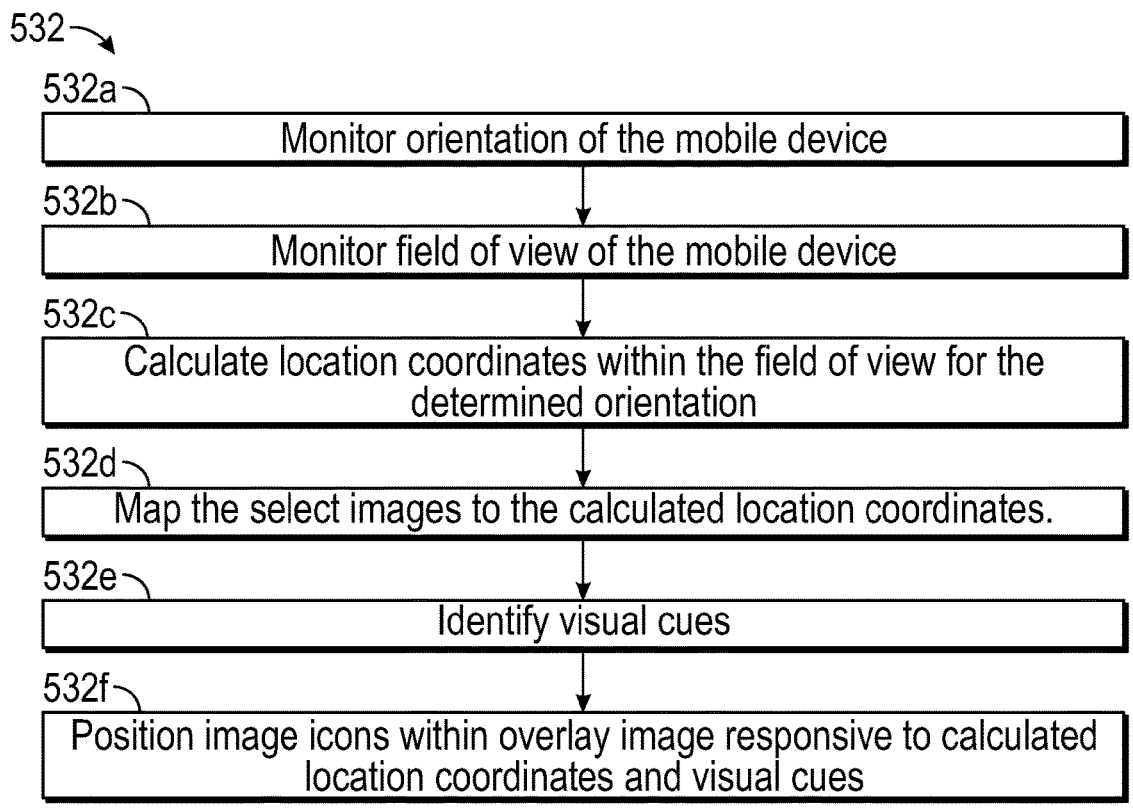

At block 530, the eyewear device 100 selects images corresponding to the location and orientation of the eyewear device 100 for display in the viewing area of the eyewear device 100. In an example, the eyewear device 100 selects images by determining orientation of the mobile device (block 530a; FIG. 5D), determining its viewing area (e.g., field of view; block 530b), calculating a location coordinate range within the field of view for the determined orientation (block 530c), and selecting images having location coordinates within the calculated location coordinate ranges (block 530d). Orientation may be determined as described above with reference to block 524. Field of view may then be determined based on an angular value associated with the optical assembly (e.g., a cone of 30 degrees surrounding the direction a central axis of the optical assembly is pointing). A coordinate range is then calculated for all coordinates within the field of view extending one half mile from the eyewear device 100 (e.g., all coordinates within the cone of 30 degrees having a distance of one-half mile between the tip and base of the cone). The eyewear device 100 then identifies all images having location coordinates meta data that are within the calculated coordinate range.

At block 532, the eyewear device 100 generates overlay images including image icons associated with the selected images for presentation by the mobile device. In an example, the eyewear device 100 generates overlay images by monitoring orientation of the mobile device (532a), monitoring the field of view of the mobile device (532b), calculating location coordinates within the field of view for the determined orientation (532c), and mapping the select images to the calculated location coordinates (532d). Optionally, the eyewear device 100 may identify visual cues within the field of view (532e) for refining the mapping and displaying of content. For example, buildings, restaurants, concert venues, and landmarks may be identified (e.g., using object recognition technology.) The eyewear device 100 then generates image icons (which may be thumbnails of the received content) and positions the image icons within an overlay image responsive to calculated location coordinates and visual cues (532f).

The eyewear device 100 may aggregate content corresponding to a particular location. In one example, all content within a location range associated with a particular visual cue such as a restaurant may be represented by an icon thumbnail image corresponding to the most recent content (e.g., image or video) of that content within the location range. In another example, the icons may be stacked on top of one another with only the icon for the most recent content fully visible. Additionally, the eyewear device 100 may alter the icon based on factors such as distance to the visual cue or quantity of content with the icon being reduced in size the further it is away from the mobile device and increased in size for larger quantities.

Figure 6A:
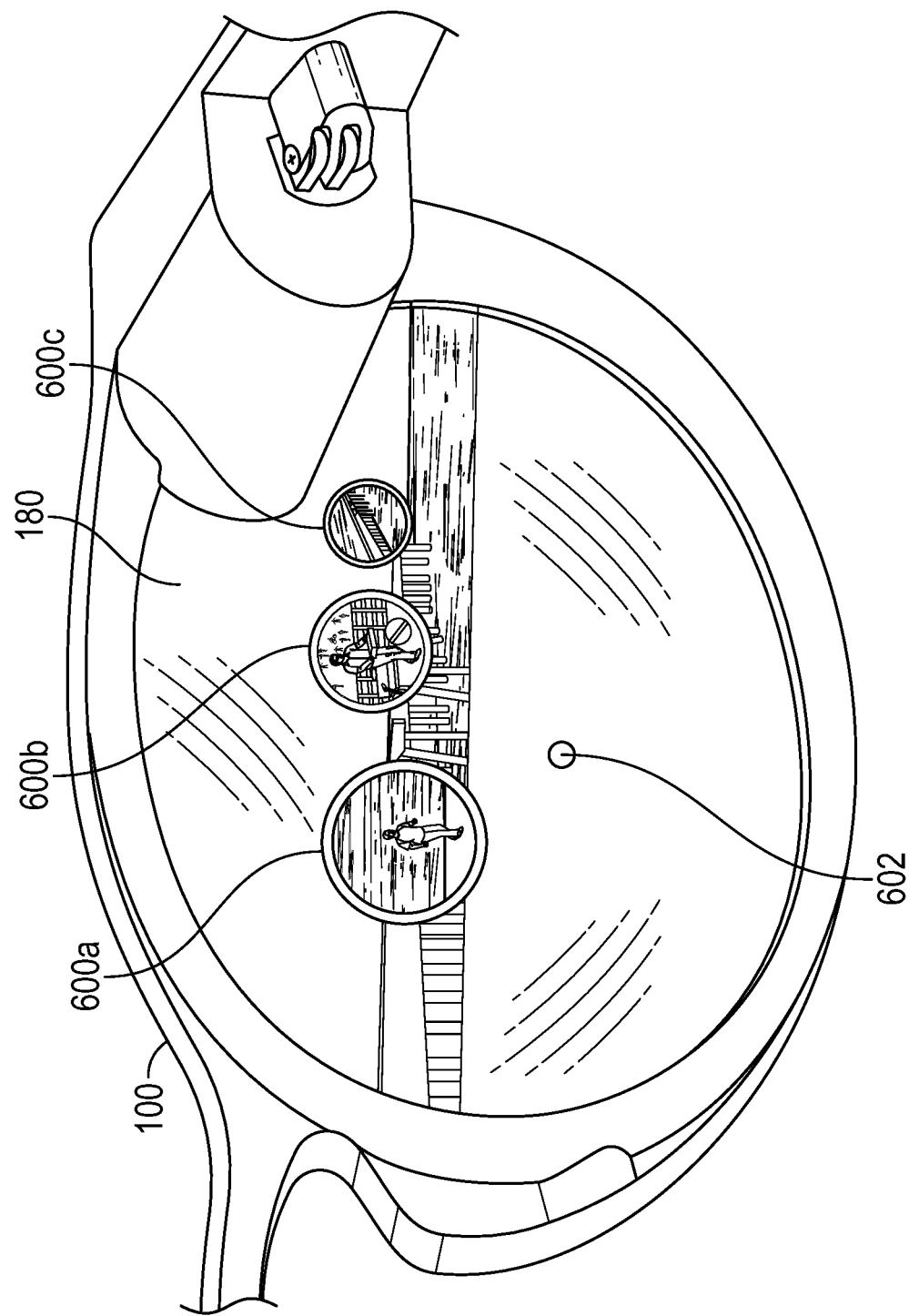
FIG. 6A is a perspective view of a scene viewed through a see-though optical assembly of an eyewear device with selectable images corresponding to where they were captured in relation to the physical location of the user.

At block 534, the eyewear device 100 presents the overlay image on the optical assembly 180 of the eyewear device 100. FIG. 6A depicts an example scene viewed through an optical assembly 180 of the eyewear device 100 with an overlay image. In the illustrated example, the scene is a pier extending from a beach into the water. The overlay image includes three icons 600. A first icon 600a represents content captured at a particular location on the beach at the water's edge. A second icon 600b represents content depicting a street performer captured at a midpoint on the pier. A third icon 600c represents content captured at the end of the pier. In the illustrated example, the first icon 600a is bigger than the second icon 600b and the third icon 600c because the content was captured at a location closer to the current location of the eyewear device 100. In another example, the second icon 600b may be bigger than the first icon 600a if, for example, there were 10 videos of the street performer captured within the last hour and only one image captured at the water's edge.

Figure 5F:
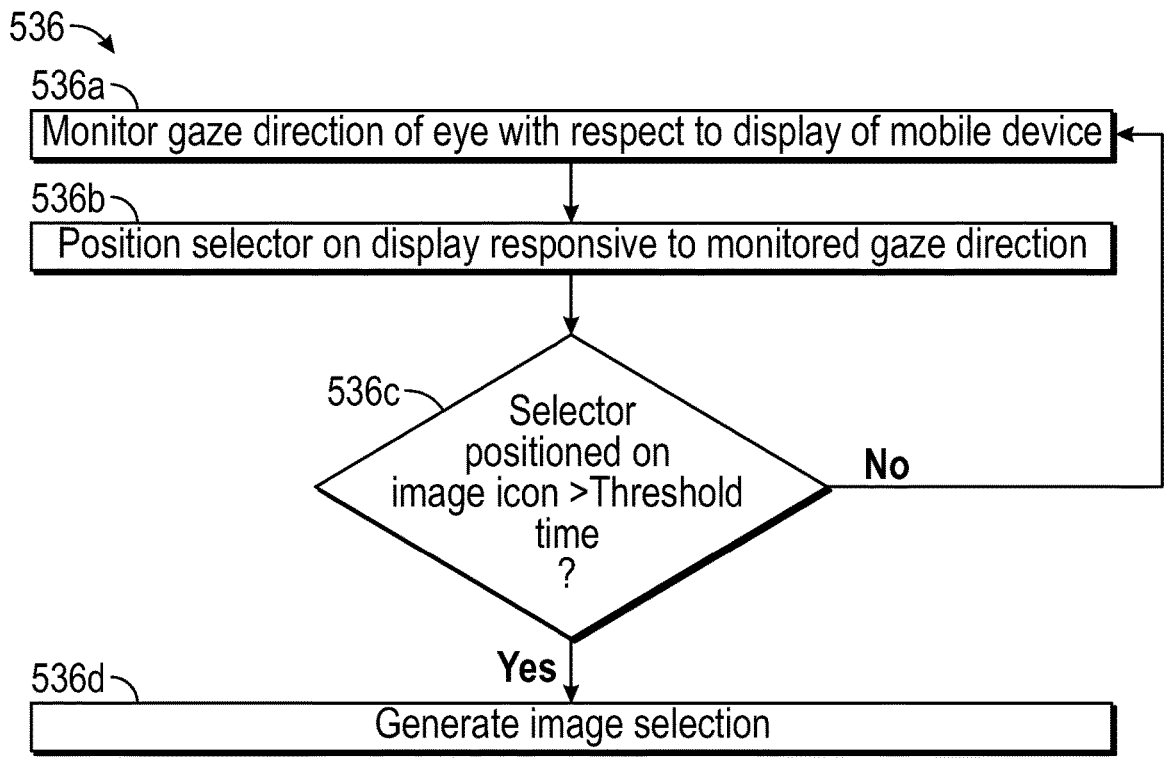

At block 536, the eyewear device 100 receives an image selection identifying one of the image icons in the presented overlay image. Eyewear device may receive the image selection via a user interface 301. In one example, the optical assembly 180 and eye movement tracker 213 provide the input selection. FIG. 6A depicts a cursor 602 positioned on the optical assembly 180 indicating the current position for user interaction. The eye movement tracker 213 tracks the eye of the wearer of the eyewear device 100 and moves the cursor responsive to the movement of the eye (blocks 536a and 536b; FIG. 5F). To select content, the user can adjust their gaze toward one of the icons, which moves the cursor 602 to that icon. In one example, content is selected when the user's gaze on the icon associated with that content exceeds a predetermined period of time (e.g., 250 milliseconds; blocks 536c and 536d). In another example, content is selected when the user's gazes at the icon associated with that content and performs a specific action detected by the eye movement tracker 213 (e.g., blinking twice in rapid succession). In examples where the mobile device is, for example, a tablet with a touchscreen display, the overlay with icons is presented on the touchscreen display of the mobile device and the user may make a selection by pressing an icon with their finger.

Figure 6B:
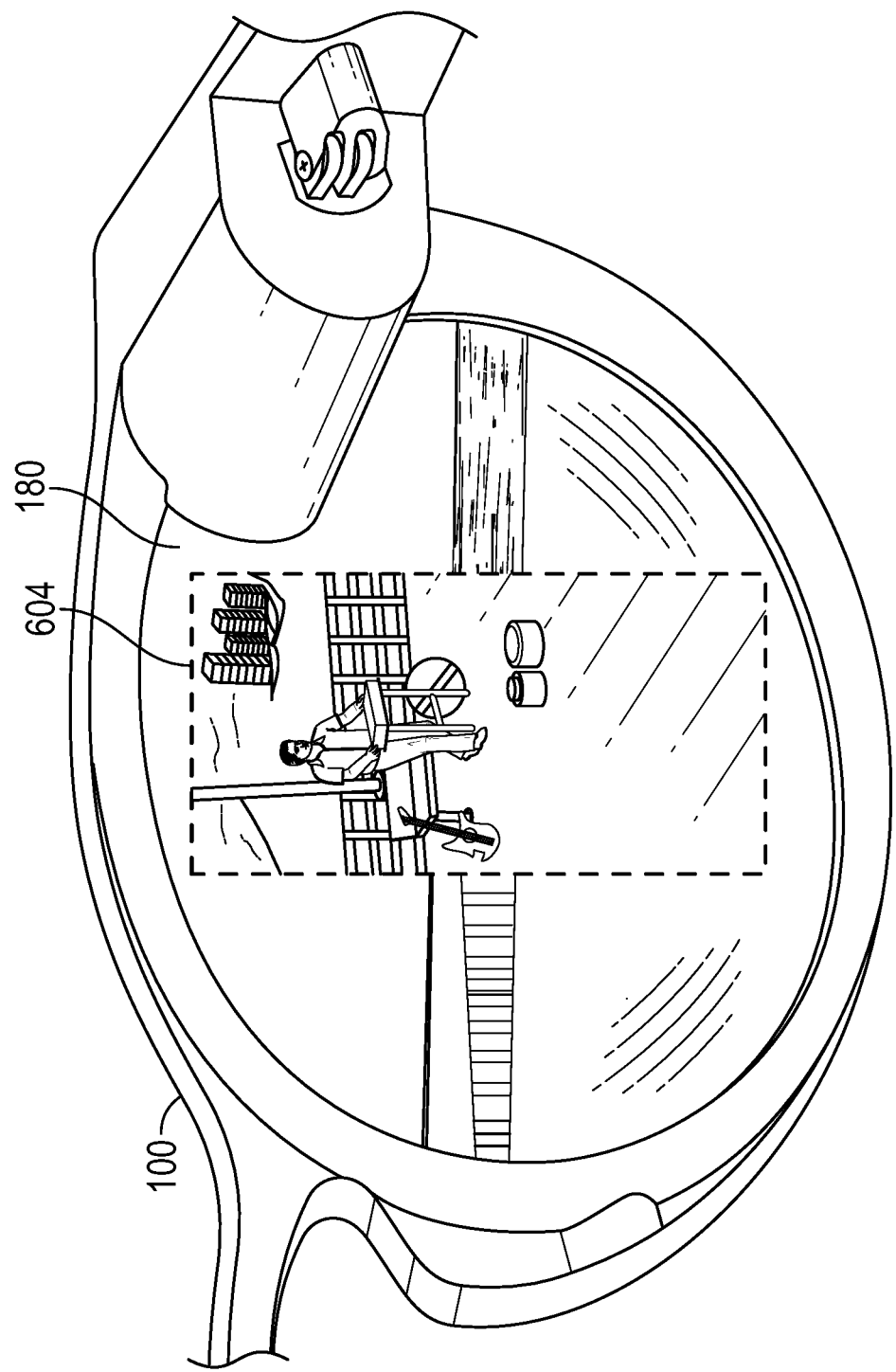
FIG. 6B is a perspective view of a scene viewed through the see-though optical assembly of FIG. 6A with a selected image presented by the see-through optical assembly.

At block 538, the eyewear device 100 presents the selected image associated with the identified image icon. The image processor 312 and image display driver 342 present the image on the optical assembly 180 of the eyewear device 100. FIG. 6B depicts content 604 (e.g., a video) on the optical assembly 180. In the illustrated example, the content 604 is associated with the icon 600b (FIG. 6A) and is presented in response to selection of that icon.

At block 540, the eyewear device 100 monitors for an image termination selection. Eyewear device may receive the image termination selection via a user interface 301. In one example, the eye movement tracker 213 provide the image termination selection in response to a specific action detected by the eye movement tracker 213 (e.g., blinking three times in rapid succession) or gazing in a specific direction for a prolonged period of time (e.g., up and to the right for over 250 milliseconds). In another example, the user interface 301 may be a physical button or touchpad on the eyewear device 100 and the user may select image termination by pressing the button or swiping a finger across the touchpad (e.g., downward).

At block 542, the eyewear device 100 processes a decision based on whether an image termination selection is received. If an image termination selection is received, processing proceeds at block 544 with the presentation of the image canceled and the optical assembly reverting to depicting icons such as depicted in FIG. 6A and repeating the steps of blocks 522-542. If an image termination selection is not received, processing proceeds at block 546.

At block 546, the eyewear device 100 processes a decision based on whether there is additional content corresponding to the location of the selected image associated with the identified image icon. If there is not additional content, the optical assembly reverts to depicting icons such as depicted in FIG. 6A and repeating the steps of blocks 522-542. If there is additional content (e.g., one or more additional image(s) corresponding to the location of the selected image associated with the identified image icon), processing proceeds at block 548.

At block 548, the eyewear device 100 receives an image advance selection. The additional images may be stored such that they are presented in reverse chronological order (i.e., from newest to oldest). The image advance selection cycles through the ordered images. In one example, the eye movement tracker 213 provide the image advance selection in response to a specific action detected by the eye movement tracker 213 (e.g., blinking twice in rapid succession) or gazing in a specific direction for a prolonged period of time (e.g., down and to the left for over 250 milliseconds). In another example, the user interface 301 may be a physical button or touchpad on the eyewear device 100 and the user may select an image forward advance by a specific press of the button (e.g., one press) or with a swiping gesture with a finger across the touchpad (e.g., back to front). In accordance with this example, the user may select an image backward advance (e.g., to view previously viewed or skipped content) by another specific press of the button (e.g., double press) or another swiping gesture with a finger across the touchpad (e.g., front to back).

At block 550, the eyewear device 100 identifies an additional image responsive to the image advance selection and, at block 552, the eyewear device 100 presents the identified image. The image processor 312 and image display driver 342 present the additional image on the optical assembly 180 of the eyewear device 100.

Any of the methods described herein such as the image capture programming 344, the image retrieval programming 345, the device location/orientation programming 346, and programming for the rendering engine 348 for the eyewear device 100, mobile device 390, and server system 398 can be embodied in one or more methods as method steps or in one or more applications as described previously. According to some examples, an "application," "applications," or "firmware" are program(s) that execute functions defined in the program, such as logic embodied in software or hardware instructions. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke application programming interface (API) calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for navigation, eye tracking or other functions described herein. "Storage" type media include any or all the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the eyewear device 100 and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A mobile device including:
  an optical assembly, the optical assembly having a viewing area for viewing a scene and configured to present overlay images to a user over the scene in the viewing area;
  at least one sensor configured to determine a location and an orientation of the mobile device;
  a processor;
  a memory accessible to the processor; and
  programming in the memory, wherein execution of the programming by the processor configures the mobile device to perform functions, including functions to:
  monitor the location and the orientation of the mobile device using the at least one sensor;
  request from a server previously captured images corresponding to where the previously captured images were captured in relation to the location;
  receive the requested previously captured images from the server;
  select images from the requested previously captured images responsive to the location and the orientation of the mobile device;
  aggregate selected images corresponding to the location within a location range associated with a visual cue;
  generate overlay images from the aggregated selected images including an image icon corresponding to most recent content within the aggregated selected images; and
  present the overlay images on the optical assembly including the image icon in the viewing area.

2. The mobile device of claim 1, wherein image icons associated with selected images are stacked on top of one another with only a most recent image icon for the most recent content within the aggregated selected images fully visible.

3. The mobile device of claim 1, wherein all images within the location range associated with the visual cue are represented by an icon thumbnail image corresponding to the most recent content within the aggregated images in the location range.

4. The mobile device of claim 1, further comprising additional programming in the memory, wherein execution of the additional programming by the processor configures the mobile device to alter the image icon based on distance to the visual cue, wherein the image icon is reduced in size the further the image content is away from the mobile device and is increased in size the closer the image content is to the mobile device.

5. The mobile device of claim 1, further comprising additional programming in the memory, wherein execution of the additional programming by the processor configures the mobile device to alter the image icon based on quantity of image content associated with the image icon, wherein the image icon is increased in size for larger quantities of image content.

6. The mobile device of claim 1, wherein the mobile device is an eyewear device comprising:
a frame supporting the optical assembly; and
a temple extending from a lateral side of the frame,
wherein the optical assembly is a see-through optical assembly supported by the frame.

7. The mobile device of claim 6, wherein execution of the programming by the processor to configure the mobile device to select images from the requested previously captured images responsive to the location and the orientation of the mobile device includes functions to:
monitor gaze direction of an eye with respect to the optical assembly of the eyewear device;
position a cursor on the optical assembly responsive to the monitored gaze direction;
monitor time the cursor is positioned on the image icon; and
present one or more images including the image icon when the monitored time exceeds a time threshold.

8. The mobile device of claim 6, wherein execution of the programming by the processor further configures the mobile device to perform additional functions, the additional functions including functions to:
monitor for an image termination instruction on the eyewear device; and
cancel presentation of the presented overlay images in response to the image termination instruction.

9. The mobile device of claim 6, wherein execution of the programming by the processor further configures the mobile device to perform additional functions, the additional functions including functions to:
associate multiple additional images with the selected images associated with the image icon based on location;
monitor for an image advance instruction on the eyewear device; and
cycle through the multiple additional images in reverse chronological order in response to the image advance instruction.

10. The mobile device of claim 1, wherein the optical assembly comprises a touchscreen display and wherein execution of the programming by the processor to configure the mobile device to select images from the requested previously captured images responsive to the location and the orientation of the mobile device includes functions to:
monitor the touchscreen display for a user input selection on the image icon on the touchscreen display; and
present the images associated with the image icon in response to the user input selection on the image icon on the touchscreen display.

11. A method for displaying images, the method comprising:
monitoring a location and an orientation of a mobile device using at least one sensor;
requesting from a server previously captured images corresponding to where the previously captured images were captured in relation to the location;
receiving the requested previously captured images from the server;
selecting images from the requested previously captured images responsive to the location and the orientation of the mobile device;
aggregating selected images corresponding to the location within a location range associated with a visual cue;
generating overlay images from the aggregated selected images including an image icon corresponding to most recent content within the aggregated selected images; and
presenting the overlay images on an optical assembly including the image icon in a viewing area of the optical assembly.

12. The method of claim 11, further comprising stacking on top of one another image icons associated with selected images with only a most recent image icon for the most recent content within the aggregated selected images fully visible.

13. The method of claim 11, further comprising representing all images within the location range associated with the visual cue by an icon thumbnail image corresponding to the most recent content within the aggregated images in the location range.

14. The method of claim 11, further comprising altering the image icon based on distance to the visual cue, wherein the image icon is reduced in size the further the image content is away from the mobile device and is increased in size the closer the image content is to the mobile device.

15. The method of claim 11, further comprising altering the image icon based on quantity of image content associated with the image icon, wherein the image icon is increased in size for larger quantities of image content.

16. A non-transitory computer-readable medium storing program code which, when executed, is operative to cause an electronic processor to perform the steps of:
monitoring a location and an orientation of a mobile device using at least one sensor;
requesting from a server previously captured images corresponding to where the previously captured images were captured in relation to the location;
receiving the requested previously captured images from the server;
selecting images from the requested previously captured images responsive to the location and the orientation of the mobile device;
aggregating selected images corresponding to the location within a location range associated with a visual cue;
generating overlay images from the aggregated selected images including an image icon corresponding to most recent content within the aggregated selected images; and
presenting the overlay images on an optical assembly including the image icon in a viewing area of the optical assembly.

17. The non-transitory computer-readable medium of claim 16, wherein the stored program code, when executed, is operative to stack on top of one another image icons associated with selected images with only a most recent image icon for the most recent content within the aggregated selected images fully visible.

18. The non-transitory computer-readable medium of claim 16, wherein the stored program code, when executed, is operative to represent all images within the location range associated with the visual cue by an icon thumbnail image corresponding to the most recent content within the aggregated images in the location range.

19. The non-transitory computer-readable medium of claim 16, wherein the stored program code, when executed, is operative to alter the image icon based on distance to the visual cue, wherein the image icon is reduced in size the further the image content is away from the mobile device and is increased in size the closer the image content is to the mobile device.

20. The non-transitory computer-readable medium of claim 16, wherein the stored program code, when executed, is operative to alter the image icon based on quantity of image content associated with the image icon, wherein the image icon is increased in size for larger quantities of image content.

* * * * *